US008266296B2

(12) United States Patent
Dowling et al.

(10) Patent No.: US 8,266,296 B2
(45) Date of Patent: *Sep. 11, 2012

(54) APPLICATION-LAYER EVALUATION OF COMMUNICATIONS RECEIVED BY A MOBILE DEVICE

(75) Inventors: Eric Morgan Dowling, Richardson, TX (US); Mark Nicholas Anastasi, Highland Village, TX (US)

(73) Assignee: East Texas Technology Partners, LP, Plano, TX (US)

(*) Notice: Subject to any disclaimer, the term of this patent is extended or adjusted under 35 U.S.C. 154(b) by 174 days.

This patent is subject to a terminal disclaimer.

(21) Appl. No.: 12/272,481

(22) Filed: Nov. 17, 2008

(65) Prior Publication Data

US 2009/0083376 A1 Mar. 26, 2009

Related U.S. Application Data

(60) Division of application No. 10/920,817, filed on Aug. 18, 2004, now abandoned, which is a continuation of application No. 10/335,821, filed on Jan. 2, 2003, now abandoned, which is a continuation of application No. 09/167,698, filed on Oct. 7, 1998, now Pat. No. 6,574,239.

(51) Int. Cl.
*G06F 15/16* (2006.01)

(52) U.S. Cl. ........ 709/227; 709/203; 709/217; 709/223; 709/234

(58) Field of Classification Search .................. 709/203, 709/205, 223, 217, 227, 234
See application file for complete search history.

(56) References Cited

U.S. PATENT DOCUMENTS

| | | |
|---|---|---|
| 4,285,061 A | 8/1981 | Ho |
| 4,416,015 A | 11/1983 | Gitlin |
| 4,489,416 A | 12/1984 | Stuart |
| 4,578,796 A | 3/1986 | Charalambous et al. |

(Continued)

FOREIGN PATENT DOCUMENTS

| | | |
|---|---|---|
| EP | 0169548 | 1/1986 |
| EP | 0741481 | 11/1996 |
| WO | 9927702 | 6/1999 |

OTHER PUBLICATIONS

"Defendant Dell Inc.'s Answer to Plaintiff's Second Amended Complaint", Civil Action No. 2-03CV-465-TJW, in the United States District Court for the Eastern District of Texas Marshall Division, (Mar. 15, 2004), 8 pages.

"Defendant International Business Machines Corporation's Answer to Plaintiff's Second Amended Complaint," Civil Action No. 2-03CV-465-TJW, in the United States District Court for the Eastern District of Texas Marshall Division, (Mar. 15, 2004), 8 pages.

(Continued)

*Primary Examiner* — Ramy M Osman

(57) ABSTRACT

Apparatus and associated methods are provided which allow a remote user to maintain a virtual session with a server. A virtual session allows a remote and possibly mobile user to maintain a virtual presence in an office environment without actually being present. Using the present invention, a remote user can access a central application program such as an Internet service provider, a database system, an inventory system or billing system. Likewise, the remote user can receive calls and other forms of communications as though he or she were present in an office environment. A virtual session does not require a physical connection to be continuously present in order to provide a virtual connectivity. This is especially important for mobile applications where the remote user may incur long distance and/or wireless toll charges. Also, methods are presented to allow a remote unit to rapidly reconnect in a transparent and seamless way without burdening the user with the need to connect and reconnect or to upload and download information. Related methods are provided to allow the virtual session to be established, operated and maintained.

20 Claims, 4 Drawing Sheets

U.S. PATENT DOCUMENTS

| | | | | |
|---|---|---|---|---|
| 4,852,151 | A | 7/1989 | Dittakavi et al. | |
| 4,995,074 | A | 2/1991 | Goldman et al. | |
| 5,027,269 | A | 6/1991 | Grant et al. | |
| 5,127,051 | A | 6/1992 | Chan et al. | |
| 5,287,401 | A | 2/1994 | Lin | |
| 5,321,722 | A | 6/1994 | Ogawa | |
| 5,329,619 | A | 7/1994 | Page et al. | |
| 5,339,392 | A | 8/1994 | Risberg et al. | |
| 5,367,563 | A | 11/1994 | Sainton | |
| 5,513,216 | A | 4/1996 | Gadot et al. | |
| 5,519,767 | A | 5/1996 | O'Horo et al. | |
| 5,539,885 | A | 7/1996 | Ono et al. | |
| 5,550,908 | A | 8/1996 | Cai et al. | |
| 5,572,528 | A | 11/1996 | Shuen | |
| 5,600,712 | A | 2/1997 | Hanson et al. | |
| 5,604,769 | A | 2/1997 | Wang | |
| 5,606,719 | A | 2/1997 | Nichols et al. | |
| 5,715,464 | A | 2/1998 | Crump et al. | |
| 5,724,412 | A | 3/1998 | Srinivasan | |
| 5,745,695 | A | 4/1998 | Gilchrist et al. | |
| 5,751,796 | A | 5/1998 | Scott et al. | |
| 5,757,890 | A | 5/1998 | Venkatakrishnan | |
| 5,764,639 | A | 6/1998 | Staples et al. | |
| 5,771,353 | A * | 6/1998 | Eggleston et al. | 709/227 |
| 5,784,562 | A | 7/1998 | Diener | |
| 5,802,293 | A | 9/1998 | van der Sijpt | |
| 5,826,085 | A | 10/1998 | Bennett et al. | |
| 5,842,199 | A | 11/1998 | Miller et al. | |
| 5,857,201 | A | 1/1999 | Wright et al. | |
| 5,859,971 | A | 1/1999 | Bittinger et al. | |
| 5,896,444 | A | 4/1999 | Perlman et al. | |
| 5,903,602 | A | 5/1999 | Torkkel | |
| 5,924,097 | A * | 7/1999 | Hill et al. | 709/208 |
| 5,928,363 | A | 7/1999 | Ruvolo | |
| 5,958,006 | A | 9/1999 | Eggleston et al. | |
| 5,978,567 | A | 11/1999 | Rebane et al. | |
| 5,982,774 | A * | 11/1999 | Foladare et al. | 370/401 |
| 6,023,493 | A | 2/2000 | Olafsson | |
| 6,052,779 | A | 4/2000 | Jackson et al. | |
| 6,058,422 | A | 5/2000 | Ayanoglu et al. | |
| 6,085,222 | A | 7/2000 | Fujino et al. | |
| 6,088,594 | A | 7/2000 | Kingdon et al. | |
| 6,088,600 | A | 7/2000 | Rasmussen | |
| 6,101,482 | A | 8/2000 | DiAngelo et al. | |
| 6,101,531 | A | 8/2000 | Eggleston et al. | |
| 6,119,165 | A | 9/2000 | Li et al. | |
| 6,119,167 | A * | 9/2000 | Boyle et al. | 709/234 |
| 6,134,582 | A * | 10/2000 | Kennedy | 709/203 |
| 6,157,630 | A | 12/2000 | Adler et al. | |
| 6,157,941 | A | 12/2000 | Verkler et al. | |
| 6,199,204 | B1 * | 3/2001 | Donohue | 717/178 |
| 6,201,962 | B1 | 3/2001 | Sturniolo et al. | |
| 6,247,055 | B1 | 6/2001 | Cotner et al. | |
| 6,263,016 | B1 | 7/2001 | Bellenger et al. | |
| 6,266,701 | B1 | 7/2001 | Sridhar et al. | |
| 6,269,402 | B1 | 7/2001 | Lin et al. | |
| 6,289,464 | B1 | 9/2001 | Wecker et al. | |
| 6,295,549 | B1 * | 9/2001 | Riddle | 709/227 |
| 6,308,281 | B1 | 10/2001 | Hall, Jr. et al. | |
| 6,317,455 | B1 | 11/2001 | Williams et al. | |
| 6,393,467 | B1 | 5/2002 | Potvin | |
| 6,418,214 | B1 * | 7/2002 | Smythe et al. | 379/202.01 |
| 6,421,707 | B1 | 7/2002 | Miller et al. | |
| 6,426,946 | B1 | 7/2002 | Takagi et al. | |
| 6,453,430 | B1 | 9/2002 | Singh et al. | |
| 6,456,603 | B1 | 9/2002 | Ismailov et al. | |
| 6,490,610 | B1 * | 12/2002 | Rizvi et al. | 709/205 |
| 6,496,572 | B1 | 12/2002 | Liang et al. | |
| 6,542,489 | B1 | 4/2003 | Kari et al. | |
| 6,546,425 | B1 | 4/2003 | Hanson et al. | |
| 6,553,490 | B1 * | 4/2003 | Kottapurath et al. | 713/1 |
| 6,560,239 | B1 * | 5/2003 | Frid et al. | 370/216 |
| 6,560,456 | B1 | 5/2003 | Lohtia et al. | |
| 6,574,239 | B1 | 6/2003 | Dowling et al. | |
| 6,584,321 | B1 | 6/2003 | Coan et al. | |
| 6,594,682 | B2 | 7/2003 | Peterson et al. | |
| 6,594,692 | B1 | 7/2003 | Reisman | |
| 6,975,710 | B2 | 12/2005 | Fujino et al. | |
| 7,206,816 | B2 * | 4/2007 | Gorty et al. | 709/227 |
| 7,373,144 | B1 | 5/2008 | Kirkpatrick et al. | |
| 2002/0048354 | A1 * | 4/2002 | Perlman et al. | 379/93.25 |
| 2003/0055327 | A1 | 3/2003 | Shaw et al. | |
| 2003/0156039 | A1 | 8/2003 | Tester | |
| 2004/0120277 | A1 | 6/2004 | Holur et al. | |
| 2005/0039048 | A1 * | 2/2005 | Tosey | 713/201 |

OTHER PUBLICATIONS

"Answer of Defendant Toshiba America, Inc. to Plaintiff's Second Amended Complaint," Civil Action No. 2-03CV-465-TJW, in the United States District Court for the Eastern District of Texas Marshall Division, (Mar. 15, 2004), 5 pages.

"Gateway, Inc.'s Original Answer and Counterclaim," Civil Action No. 2-03CV-465-TJW, in the United States District Court for the Eastern District of Texas Marshall Division, (Mar. 18, 2004), 8 pages.

"Hewlett-Packard Co.'s Original Answer and Counterclaim," Civil Action No. 2-03CV-465-TJW, in the United States District Court for the Eastern District of Texas Marshall Division, (Mar. 18, 2004), 8 pages.

Agere Systems, Inc. "Complaint," Civil Action No. 2-04CV-108, in the United States District Court for the Eastern District of Texas, (Mar. 17, 2004), 6 pages.

"Plaintiff Agere Systems Inc.'s First Amended Complaint," Civil Action No. 2-04CV-108, in the United States District Court for the Eastern District of Texas Marshall Division, (May 11, 2004), 29 pages. (including Appendix A).

"Plaintiff East Texas Technology Partners' Answer and Counterclaim to Intervenor Conextant's Complaint," Civil Action No. 2-03-CV-465-TJW, in the United States District Court for the Eastern District of Texas Marshall Division, (Apr. 21, 2004), 10 pages.

"Emachines, Inc.'s Original Answer and Counterclaim," Civil Action No. 2-03-CV-465-TJW, in the United States District Court for the Eastern District of Texas Marshall Division, (Apr. 22, 2004), 8 pages.

"Answer of Defendant in Intervention Conexant Systems, Inc. to Plaintiff East Texas Technology Partners' Counterclaim," Civil Action No. 2-03-CV-465-TJW, in the United States District Court for the Eastern District of Texas Marshall Division, (May 12, 2004), 6 pages.

"Conexant Systems, Inc.'s Motion to Intervene," Civil Action No. 2-03-CV-465-TJW, in the United States District Court for the Eastern District of Texas Marshall Division, (Mar. 10, 2004), 27 pages (including Exhibits A & B).

"Answer of Defendant Acer America Corp. to Plaintiff's Second Amended Complaint," Civil Action No. 2-03-CV-465-(Ward), in the United States District Court for the Eastern District of Texas Marshall Division, (Mar. 29, 2004), 8 pages.

WAP Architecture Version Apr. 30, 1998, "Wireless Application Protocol Architecture Specification", Wireless Application Protocol Forum, Ltd., (Apr. 30, 1998), pp. 1-20.

WAP WTA Draft Version Apr. 30, 1998, "Wireless Application Protocol Wireless Telephony Application Specification," Wireless Application Protocol Forum, Ltd., (Apr. 30, 1998), pp. 1-31.

"Defendant's Supplemental Preliminary Invalidity Contentions", Civil Action No. 2-03CV-465-TJW in the United States District court for the Eastern District of Texas Marshall Division, 73 pages.

Warrier, Padmanand, "Universal DSL Deployment of G.Lite", Texas Instruments Application Report SPAA007A, (Sep. 1998), 33 pages.

"239 Invalidity Chart for G.Lite Standard", no date, 26 pages.

"239 Invalidity Chart for European Patent No. 0169548", no date, 47 pages.

"239 Invalidity Chart for European Patent No. 0741481", no date, 22 pages.

Wireless Application Protocol, Wireless Session Protocol, Draft version Apr. 30, 1998, copyright Wireless Application Protocol Forum, Ltd., 1998, 95 pages.

Official Action in U.S. Appl. No. 12/194,311 issued Apr. 4, 2011, 34 pages.

Office Action in U.S. Appl. No. 12/194,311 Oct. 6, 2011, 21 pages.

* cited by examiner

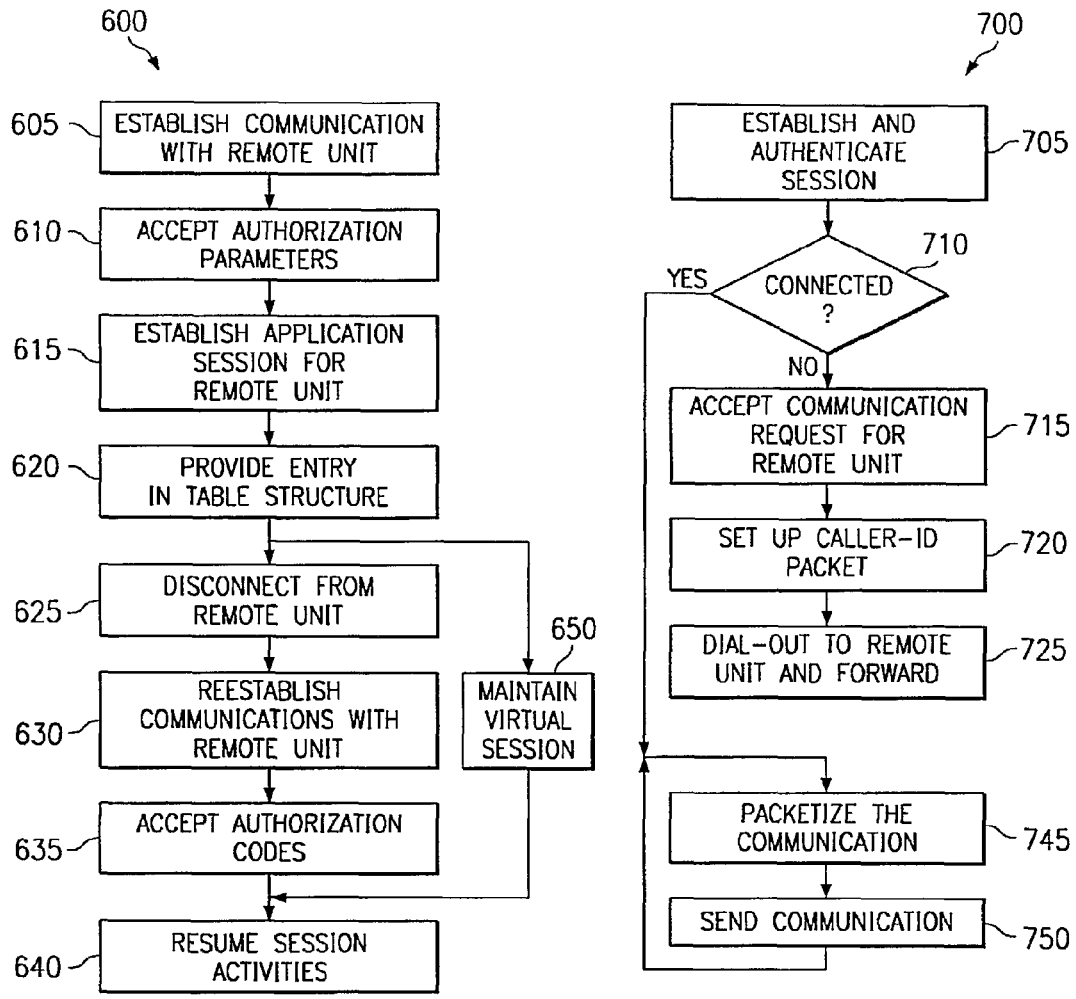
FIG. 6
FIG. 7
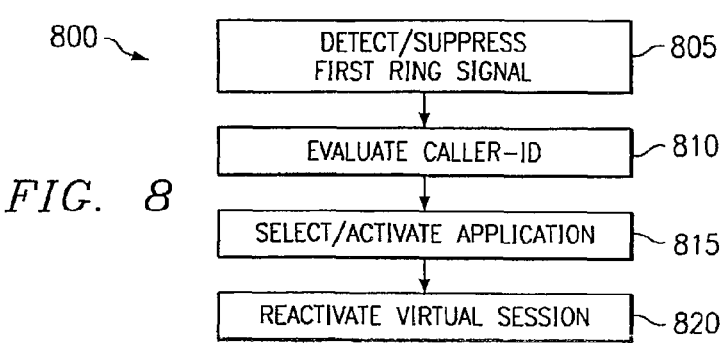
FIG. 8

APPLICATION-LAYER EVALUATION OF COMMUNICATIONS RECEIVED BY A MOBILE DEVICE

CROSS-REFERENCE TO RELATED APPLICATIONS

The present application is a divisional of U.S. patent application Ser. No. 10/920,817, filed Aug. 18, 2004, which is a continuation of U.S. patent application Ser. No. 10/335,821 filed Jan. 2, 2003, now abandoned, which is a continuation of U.S. patent application Ser. No. 09/167,698, filed Oct., 7, 1998, now U.S. Pat. No. 6,574,239, entitled "Virtual Connection of a Remote Unit to a Server." The present application claims priority to these applications and incorporates them by reference herein in their entireties.

BACKGROUND OF THE INVENTION

1. Field of the Invention

This invention relates generally to client-server computing architectures and communication techniques. More particularly, the invention relates to a system whereby a mobile worker and a central server may maintain a virtually continuous connection without the need to maintain a physical connection continuously.

2. Description of the Related Art

The concept of a virtual connection has arisen in connection with telecommuting and related applications. Such a system is described in U.S. Pat. No. 5,764,639. A telecommuter dials into a server using a standard telephone line. The telecommuter's modem and a modem controlled by the central server establish a connection therebetween. Once a connection is established, the telecommuter may access a computer connected to the server, read emails and receive phone calls and faxes. For example, if a customer attempts to call the telecommuter at work by dialing into a private branch exchange (PBX), the server will convert the incoming call to a packetized form, such as H.323, and redirect the call via the existing connection between the telecommuter and the server. Using this system, the telecommuter may access a computer at work, answer phone calls and answer emails. The telecommuter thus appears to be present in his or her office and thus has a virtual presence there. Note for this system to properly function, the telecommuter must stay connected to the server at all times. While this does not present a significant problem for local telecommuting, this solution is quite costly for long distance telecommuting. Likewise, this solution is very costly if the telecommuter is mobile and must maintain a virtual presence with the server using a cellular wireless connection. Furthermore, in some areas it may be difficult to maintain a wireless connection continuously. A lost connection may also prevent one from regaining access to the system until some period of time has passed. Some mobile workers require only intermittent access to the server, but find it too inconvenient to place a dial-in call and to log onto the system every time access is needed.

There is a need to provide mobile workers with various forms of virtual connectivity. Mobile workers differ from telecommuters in that while a telecommuter typically works from a single home location or remote office, a mobile worker moves from location to location during the course of a normal working day. An example of a mobile worker is a home-care professional. A home-care professional is a medical worker who periodically travels to visit with different sets of homebound patients according to their individual needs. The individual patients each have a set of medical records indicative of their medical histories. A patient's medical record is preferably maintained as an interactive electronic document containing multiple parts. For example, the medical record indicates to the home-care professional precisely what procedures are to be performed and what medications are to be administered or otherwise given to the patient. Once the services are performed, the home-care professional must annotate the medical record accordingly. The medical record is updated to reflect the patient's vital signs and other information related to patient progress. Also, a billing system takes note to track expendables and services rendered. For example, the patient may be billed per visit and each visit may involve the expenditure of billable resources such as medicines.

In the above scenario, a mobile worker must interact with a central server during the course of a day. The worker may wish to access the central server while visiting a patient. The worker may also wish to access the server from a location where only a wireless connection can be established. From a performance perspective, an ideal solution is to provide the mobile worker with a wireless connection from a remote unit to a central server. Such a wireless connection could be established via a high-powered radio connection with a broad area of coverage or via an existing cellular or personal communication system (PCS) network. Solutions using high-powered radio links have the disadvantage that costly spectrum may be required. Maintaining a link on a cellular or PCS system is expensive in that a continuous connection consumes billable airtime which is also very costly. From an airtime-cost perspective, an ideal solution would be to force the worker to create a connection, download or up load information, and work locally with data on the remote unit as often as possible. This solution is tedious, and while saving airtime costs, may actually represent the more costly solution when professional service costs are factored in. This method has the added disadvantage that when files are uploaded or downloaded the data must be synchronized in case another user has changed the data in parallel with the mobile worker. Alternatively, other users must be "locked out" of the file from the time the mobile user downloads it until it is finally uploaded with any changes made. This is the problem solved using semaphores in shared memory systems. In the context of the present invention, a "file semaphore" is a semaphore used to lock a second user out of a file while a first user is using it. Due to the aforementioned reasons, in many applications forcing the worker to repeatedly connect, disconnect, upload and download information is unacceptable.

Some mobile networks have been constructed using what is known as cellular digital packet data (CDPD). In a CDPD network, a remote unit transmits a data packet on an unused analog channel. In this sense the mobile unit remains virtually connected to a CDPD communication server. Wireless airtime is only consumed when data is actually sent. A disadvantage to this approach is CDPD networks are not universally available. Cellular coverage is much more ubiquitous than CDPD coverage. Also, CDPD network subscribers must often pay high fees and hence CDPD may not represent the most economical solution.

In some systems such as packet switched network routers, offices make use of dial-out links. Dial-out links are useful when remote offices are separated by long distances. In such systems, when a packet must be routed from a first office to a second office, a call is placed to route the packet. The dial-out connection remains connected until a no-traffic condition is detected, indicating the line is no longer active. When the no-traffic condition is detected the connection is dropped until it is again needed. Dial-out links are thus used to reduce long distance fees associated with maintaining a constant connection, and represents a useful starting point for solving the foregoing problems relating to the establishment of a virtual presence of a mobile worker. Client-server protocols and fast automated connection strategies employing dial-out links are needed to provide new ways for a mobile worker to maintain a virtual presence. Also, new methods are needed to enable dial-out links to be set up with low delays to make them more useful for novel systems.

It would be desirable to provide a system whereby a remote worker could maintain a seamless connection with a central server without the need to maintain a dedicated channel. It would be desirable if the remote worker could communicate with the central server without the need to spend time to enter a password, reconnect, and wait for a line negotiation sequence to proceed before being able to use the connection. It would be desirable for a protocol stack to activate a virtual session based on a prediction derived from a workflow. It would be desirable to use this prediction to set up a connection in the background without disturbing the mobile worker while the mobile worker performed tasks in a workflow. It would also be desirable to have a remote unit which contains most of the screen-related information needed to provide the appearance of an established connection before the connection has been fully established. It would be desirable for the remote unit to download information before it is needed and upload information after it is gathered without the user even being aware these actions are being performed. It would further be desirable to establish a virtual session using a first communication medium such as a landline and to later communicate using the same virtual session using a second communication medium such as a wireless link. This would allow a mobile worker to select the most economical or convenient means of communications at a given time. In embodiments involving modem-based connections, it would be desirable to transmit data immediately using instantly available but lower line speeds. It would be desirable to then negotiate a higher line speed in the background while the remote worker and/or the server perform other tasks. Moreover, it would be desirable to establish a session between a remote unit and a server so that various forms of communications may proceed while providing the user with the appearance the user is continuously connected to the server and has a virtual presence with the server.

SUMMARY OF THE INVENTION

The present invention solves these and other problems by providing systems and methods to enable a remote worker to stay virtually connected to a central server without the need to continuously remain connected via a physical channel. The present invention is useful when costs are associated with maintaining a connection, for example when the connection has associated with it long distance, wireless, or other usage-related toll charges.

A first aspect of the present invention involves a communication protocol making use of a virtual session layer. The virtual session layer allows a communication session and an application session to be maintained in an inactive state when no physical connection exists. When a remote unit later reconnects with a server, the virtual session is placed into an active state and session communications resumes as though uninterrupted. A remote unit, a virtual session server, and a communication system including the remote unit and the virtual session server are presented to support virtual sessions communications. In one embodiment, the virtual session server manages a logon session between the remote unit and a server-side application program. The virtual session server emulates the presence of the remote unit to the server-side application program and thereby maintains the logon. In related embodiments, the server-side application program involves a communication server capable of relaying messages and establishing communication channels with the remote unit using the virtual session layer.

A second aspect of the present invention involves a method of accessing a central server from a remote unit. A first step involves presenting a workflow to a user via a user interface. A second step involves predicting, based upon the workflow, when the user will require connectivity to the central server. Based upon the prediction and in the background, a third step involves initiating the establishment of a physical layer communication connection to the central server.

A third aspect of the present invention involves a method of establishing a connection with a low connection set-up time. In a first step, the method initiates the establishment of a communication connection to be used to communicate with a remote entity. Next the method communicates application layer data via the communication connection prior to the completion of a line-rate negotiation process. Next the method negotiates a line speed in the background.

A fourth aspect of the present invention involves a method of setting up and operating a virtual session. This method can be practiced by a client-side remote unit or a server-side virtual session server. A first connection is established to a remote entity. This first connection is then used to establish a set of parameters needed to define a communication session with the remote entity. Next the first connection disconnected and a set of communication session parameters are maintained. Next a second connection to the remote entity is established and an authorization sequence is communicated. The communication session is next reactivated using the communication session using the second connection. A related method is used to allow a remote unit to maintain a virtual communications presence with a remote communication server coupled to a virtual session server.

BRIEF DESCRIPTION OF THE FIGURES

The various novel features of the present invention are illustrated in the figures listed below and described in the detailed description which follows.

FIG. 6 is a flow chart illustrating a method of processing performed on a server acting as a front-end to an application program to maintain sessions for remote users who are not continuously physically connected to the application program.

FIG. 7 is a flow chart illustrating a method of processing performed on a server managing virtual connections for users who are not continuously physically connected to the server.

FIG. 8 is a flow chart illustrating a method of processing performed by a remote unit to accept different types of incoming calls.

DETAILED DESCRIPTION OF THE PREFERRED EMBODIMENTS

Figure 1:
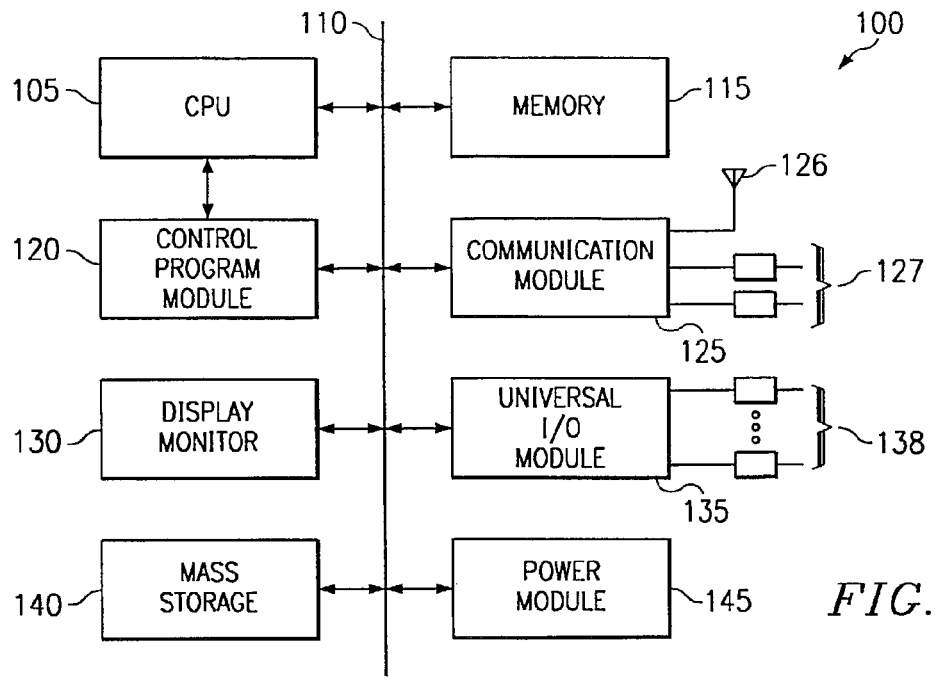
FIG. 1 is a block diagram representing an embodiment of a remote unit designed in accordance with the present invention.

FIG. 1 is a block diagram representing an embodiment of a remote unit 100 designed in accordance with the present invention. The remote unit 100 may be implemented as a laptop computer, a personal digital assistant, a desktop computer or workstation, or as a dedicated unit customized for a particular application. The remote unit 100 includes a central processing unit (CPU) 105 connected to a central bus 110. The central processing unit may be implemented using an available microprocessor, microcontroller, or customized logic. For example, a Pentium™. processor from Intel Corp. may be used to implement the CPU 105. The central bus is preferably constructed as a set of unbroken wires used to carry signals between a set of component subsystems within the remote unit 100. It should be noted, in some embodiments of the present invention, the bus 110 may be implemented equivalently using a set of direct parallel and/or serial connections between individual modules. The bus 110 as illustrated in FIG. 1 shows a low cost and a preferred means to connect the illustrated subsystems. Any combination of bus connections and direct serial or parallel links may be used to implement the connection structure provided by the bus 110. Different implementations represent different price-to-performance ratios and will be dictated by the needs of an individual embodiment. The bus 110 also comprehends multi-layered bus structures. For example, some embodiments make use of a local processor bus connected to the CPU 105, and a peripheral interconnect bus for other subsystems. In multi-layered bus based designs, the different layers are preferably connected by bus bridges. All of these and other equivalent embodiments of the bus 110 are known to the skilled artisan. From here forward, the discussion will center on the illustrated embodiment of the remote unit 100 whereby all subsystems are directly connected via the bus 110. Embodiments where the bus 110 represents a different physical interconnection topology are implicitly included in the discussion below.

A memory 115 is also coupled to the bus 110. The memory 115 may be implemented using static random access memory (SRAM) or dynamic random access memory (DRAM). One type of SRAM is read-only memory (ROM). Preferably the memory 115 includes a ROM for use at boot-up, and a DRAM to hold a significant amount of data storage for use while executing programs. The remote unit 100 also includes a control program module 120. The control program module 120 is controllably coupled to the CPU 105 and is also coupled to the bus 110. The central program module 120 typically exists as a software module executed from the memory 115 by the CPU 105. The control program module 120 effectively configures the remote unit 100 to operate in accordance with aspects of the present invention as discussed herein below.

A communications module 125 is also coupled to the bus 110. The communications module includes at least one communication interface to allow the remote unit to communicate with a remote entity such as a virtual session server as will be discussed in detail hereinafter. In a preferred embodiment, the communications module 125 includes a plurality of communication interfaces. For example, a first interface 126 provides a wireless link, and a second communication interface 127 provides one or more wireline links. Also, the wireline communication interface 127 may include a standard telephone modem interface and a packet style interface designed to plug directly into an Ethernet connection to be coupled to a local area network (LAN), a wide area network (WAN) or the Internet. The Internet is the well-known and ubiquitous World Wide Web. In some embodiments, the communications module 125 includes a caller-identification packet processor. A caller-identification packet processor receives a caller-identification packet, extracts information therefrom, and passes the information to the CPU 105. Caller-identification packets may be advantageously used to identify incoming calls with a virtual session as discussed in connection with FIGS. 7-8. The communications module 125 may optionally include a voice interface to allow a user to engage in telephone conversations using the remote unit 100. In this case a separate handset or a built-in handset may be used. Alternatively a speakerphone may be built into the remote unit using a microphone, a speaker, and an echo canceller.

The remote unit 100 also includes a display monitor 130. The display monitor 130 is also coupled to the bus 110. The display monitor 130 is preferably implemented using a liquid crystal display (LCD), although other display technologies may equivalently be used. Also connected to the bus 110 is an optional universal input-output (I/O) module 135. The universal I/O module includes a coupling to a set of external devices 138. The external devices are preferably data collection units as described below. The universal I/O module preferably provides a standard link layer interface to the software module 120 executing on the CPU 105. The remote unit 100 also preferably includes a mass storage device 140. The mass storage device 140 is also connected to the bus 110. The mass storage device is preferably implemented using magnetic disk or optical disk technology, but any mass storage device, to include a non-volatile memory, may be used.

The remote unit 100 also includes a power module 145. The power module is preferably and optionally coupled to the bus 110 to receive power management control information. The power module preferably includes a battery, an alternating current (AC) connector, a direct current (DC) connector, and a power management control interface. The AC connector allows the remote unit 100 to be powered from a standard 110 V wall outlet. The DC connector allows the remote unit 100 to be powered from a vehicle, for example by plugging the unit into a cigarette lighter outlet. Either of these connectors may be preferably used to also charge the battery in the remote unit. The power module 145 is coupled to supply power to a power bus which is connected to all subsystems. Depending on the power management configuration of an individual system, different subsystems may accept power from separate connections to allow portions of the remote unit to be selectively turned off while they are not being used.

The remote unit 100 is operative to execute an application program. The application program is operative to supply a sequence of interactive screens or a menu based interface to the user. The sequence of interactive screens or a particular usage of a menu based system implements a workflow. In an example embodiment, the remote unit 100 is carried by a home-care professional. The home care professional has a sequence of procedures which need to be implemented in the course of working with a patient. This sequence of procedures gives rise to the workflow implemented in the control program 120 which executes on the remote unit 100. In the example embodiment involving a home-care professional, the universal I/O module is connected to a set of peripheral units to collect vital information such as blood pressure, temperature, insulin level and the like. Other information such as the patient's weight may be entered manually by the home-care professional as a part of the workflow. At certain times in the workflow, an external communication connection will be needed because data may need to be uploaded or downloaded to/from a central server. In accordance with the present invention, the remote unit 100 is operative to provide a seamless and transparent virtual presence with the central server. In general, the central server may itself be segmented into two or more individual central servers. The discussion herein focuses on an embodiment whereby a virtual presence is maintained with a single central server having multiple server components. The present invention may be equivalently practiced by embodiments involving a virtual presence with more than one central server. Thus, one remote unit could maintain multiple virtual connections to totally separate server systems. In such a configuration the application workflow would dictate to which server system the remote unit would physically connect while other servers remain virtually connected.

A key aspect of the operation of the remote unit 100 is its ability to maintain a virtual presence with the central server without continuously maintaining a physical connection. The remote unit 100 is operative to provide communications when it is needed without the user needing to go through a set of normally associated connection sequences. For example, in accordance with one aspect of the invention, the user need only interact with the screens provided to implement the workflow while the remote unit 100 automatically sets up a connection in the background to be available when it is needed. In embodiments where file synchronization is not an issue or is handled using file semaphores, the software implementing the workflow automatically downloads information before it is needed and later automatically uploads new information after it has been gathered. This way, users need not even be aware they are not connected at all times. The user is not burdened with the need to connect and reconnect, and need not be burdened with downloading and uploading data. The user experiences the full benefit of being continuously connected to the central server without the associated cost of remaining continuously connected via a physical connection. In systems where file semaphores are not employed, the physical connection is established just before the workflow indicates it will be needed and is dropped when the workflow indicates it will not be needed for some time. Further details of the operation of the remote unit 100 are given in the discussions provided in connection with FIGS. 2-8.

A central aspect of the present invention involves the concept of a "virtual session." A session as defined herein is similar to the definition provided in the open systems interconnect (OSI) reference model from the International Standards Organization (ISO). The OSI model is a model of a layered software structure used in computer communications. A software system which implements a layered model of communication is known as a "protocol stack." The OSI model is well known and divides a computer communications process into seven layers. At each layer is a software module which communicates with a peer software module at the same layer. Within a protocol stack, each layer communicates with the layer above and/or below. Actual communication systems often deviate from the seven layer OSI model. A protocol stack using basic concepts similar to the seven layer OSI model is next discussed which represents an aspect of the present invention.

Figure 1A:
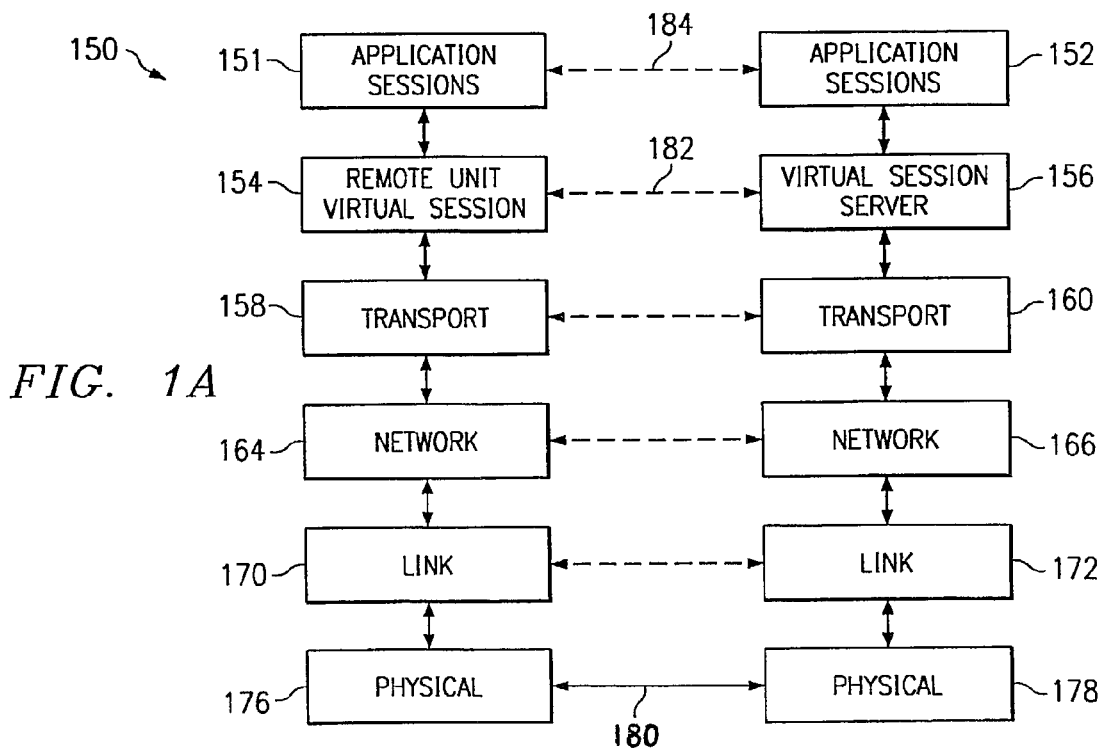
FIG. 1A is a block diagram illustrating a layered software architecture representative of the communication protocols of the present invention.

FIG. 1A illustrates a representative protocol 150 used to support the present invention. At the top layer is an application session layer. A first protocol stack with an application session layer software module 151 communicates with a second protocol stack with an applications session layer software module 152. The application session layer software module 151 is typically implemented as a client-side software module which presents a user interface to a user. The application session layer software module 152 is typically implemented by a server-side software module operative to provide communication and/or computer related services to the client-side software module. For example the application sessions layer software module 152 may involve a logon session with a database program, or may represent a unified messaging server supplying voice mail, email and fax mail. Similarly, the application session layer software module 152 may involve a telephony application operative to provide a packet switched or a circuit switched telephone connection to the client-side application session layer software module 151. One layer down in the protocol stack is a virtual session layer. In the example embodiment, the first protocol stack implements a virtual session layer software module 154 in the remote unit 100. The virtual session layer software module 154 communicates with a peer virtual session software module 156 via the peer-to-peer communication path 182. In the exemplary embodiment, the virtual session layer software module 156 is implemented within a virtual session server as discussed in connection with FIG. 2. The virtual session server typically maintains a table linking one or more application sessions to a virtual session. For example, this linking of application sessions into the table structure may be accomplished by including a pointer to a data structure containing application session control data, or by placing the data structure holding the application session control data directly in the table structure. Additionally, the table structure allows the virtual session server to maintain a plurality of virtual sessions with a plurality of client remote units. In the OSI model, the OSI-session layer provides a set of rules used to establish and terminate data streams between nodes in a network. A set of OSI-session layer services include establishing and terminating node connections, message flow control, dialog control, and end-to-end data control. The session layer controls dialogs, which involve conversational protocols as used in mainframe computer terminal communications. The virtual session layer 154, 152 of the protocol 150 may perform any of these functions in addition to maintaining the table linking to the application sessions.

The next software modules in the first protocol stack are the transport layer 158, the network layer 164, the link layer 170 and the physical layer 176. These software modules respectively perform peer communications with the server-side protocol stack's software modules 160, 166, 172, and 178. The physical layer defines the low-level mechanical and electrical channel protocols and the physical connection itself. These four lower layers are well known in the art of data communications and can be implemented in various well-known ways. Likewise, alternative and equivalent protocol stacks may be constructed, for example, with the transport layer removed, various layers merged into one, or new layers added.

An important aspect of a virtual session oriented communication protocol such as the protocol 150 is the ability to maintain a peer-to-peer virtual session communication path 182 without the presence of a physical layer communication path 180. The physical layer communication path 180 represents a physical layer communication connection, for example, a wireline connection, a cellular wireless connection, or a network connection to the Internet. When the physical layer communication path 180 is disconnected, no physical channel exists between the client-side software and the server-side software, and the physical layer communication path 180 is said to be in a "disconnected state." However, data structures maintained at the virtual session layer allow one or more peer-to-peer application session communication paths 184 to remain in a deactivated but existent state, even when the physical layer communication path is in the disconnected state. Likewise, the virtual session communication path 182 established between the remote unit and the virtual session server also remains in a deactivated but existent state. This is made possible through the use of the table structure maintained in memory which retains its information after the physical layer communication path 180 has been disconnected. When the physical layer communication path 180 has been reconnected, the physical layer communication path is said to be placed into a "connected state." At such time, the virtual session layer software modules 154 and 156 are operative to reactivate the virtual session layer communication path 182 and the application sessions layer communication path 184. When these paths are reactivated, peer-to-peer communication may once again proceed over the application session layer communication path 184 and the virtual session layer communication path 182.

As defined herein, a distinction is made between a communication session and an application session. A communication session is defined as a session between nodes or communication endpoints, and an application session is defined as a session between applications. For example, a remote unit may establish a communication session with a central server. In this case a communication session is established between the communication endpoints, i.e., the remote unit and the central server. Also, an application program running on the remote unit may need to establish an application session with an application program running on the central server. In such case an application session is created using a connection stream provided and governed by the communication session. A table structure is used to maintain both the communication session parameters and the application session parameters. For example, a first user authentication parameter may be used to establish a communication session with the server. A second user authentication parameter may be used to establish an application session with the application program. This second user authentication parameter may include a user identification parameter and a password, for example.

In light of the aforesaid concepts, a "virtual session" is next defined. A virtual session is preferably implemented as a communication session as defined above. A virtual session, like an OSI session, provides a set of rules for establishing data streams between nodes or endpoints. The virtual session also may provide other session features such as dialog control, message flow control, and end-to-end data control. A virtual session is controlled using a data structure which provides a way to associate the virtual session with the lower layers of a protocol stack, leading down to a physical layer. As mentioned above, in most embodiments, a virtual session is implemented as a communication session. Application sessions are then added onto the virtual session as connection streams within the communication session.

In a virtual session, a communication session may be suspended with some or all of the lower layers of the protocol stack missing. In particular, a virtual session may be maintained while a physical layer connection has been removed. The virtual session can then be reassociated with a physical layer connection at a later time. The virtual session thus also preferably provides connect and reconnect rules used to establish a virtual session and then to reassociate the virtual session to a new physical connection to set up a new data stream in support of a dialog at a later time. Related activities such as the initiation of dial-out links to reestablish a physical layer communication path is also preferably handled by the virtual session in response to a signal from an application layer program.

An aspect of a virtual session is the maintenance of an application between an application program and a virtual session server as will be described below. A virtual session server acts as a proxy agent for a remote unit. When the remote unit is not connected via a physical layer communication path, the virtual session server maintains a proxy-presence with the application program on behalf of the disconnected remote unit. At a later time, when the remote unit reconnects into the virtual session by passing a set of communication session authentication parameters, the remote unit is thereby granted access to one or more application sessions which have been maintained in proxy by the virtual session server.

In a preferred embodiment, the virtual session uses a set of authentication parameters and a set of encryption keys to maintain a secure connection. A separate set of authentication parameters is used by an application running on the remote unit to gain access to an individual application session. Once the application session has been established over a virtual session, a table is used to maintain a set of parameters needed to maintain the application session, even though no physical layer connection exists between the endpoints of the virtual session. When a virtual session data structure is set up and no physical layer connection exists to support communication over the virtual session, the virtual session is said to be "inactive." When a virtual session data structure is set up and a physical layer connection does exist to support communication over the virtual session, the virtual session is said to be "active." A transition from an active state to an inactive state is called "deactivating a virtual session," and a transition from an inactive state to an active state is called "activating a virtual session." The process of transitioning from an active state to an inactive state is also known as "disconnecting from a physical connection." When this occurs, the physical layer connection is no longer available to support communication over the virtual session. In a preferred embodiment, a table structure is used to maintain the virtual session parameters as well as a set of parameters for each application session established over the virtual session. When a virtual session is activated, there is no need to reauthenticate the individual application sessions. This is because the table typically includes a user identification parameter, a user password, a set of application session parameters, a communication session identification parameter, and an encryption key for the communication session. Additional data such as modem initiation parameters may be added to the table as required by the system configuration and usage.

Figure 2:
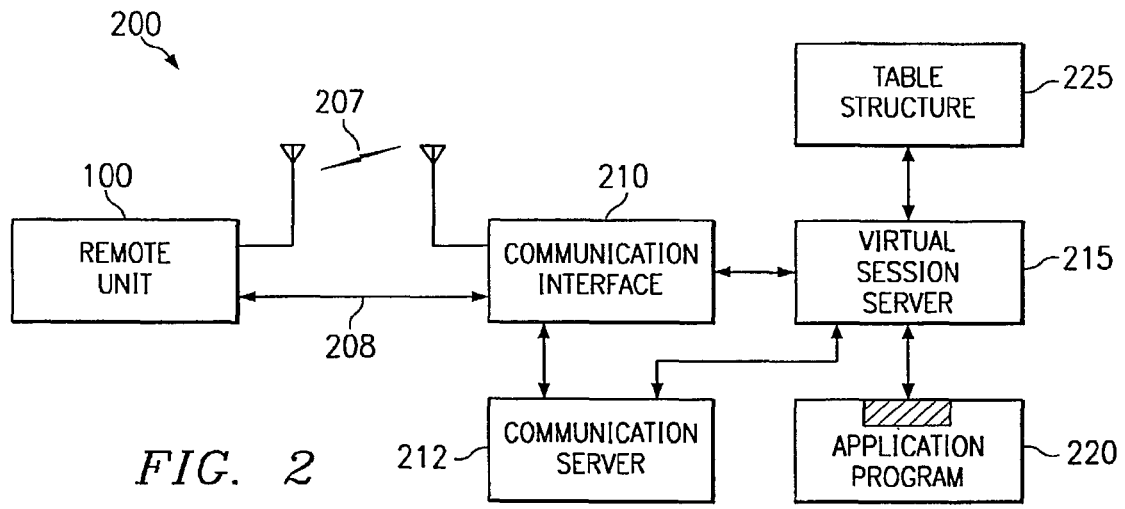
FIG. 2 is a block diagram illustrating a system comprising a remote unit operably coupled to a server via a communication medium.

Referring now to FIG. 2, a block diagram illustrating a system configuration 200 is shown. The system configuration 200 includes the remote unit 100 operatively coupled to a communication interface 210. A direct wireless link 207 optionally couples the remote unit 100 to the communication interface 210. A direct wireless link is used in embodiments where the remote unit 100 maintains a direct wireless link with the communication interface 210. The communication interface thus provides an air interface for the direct wireless link. Alternatively or in addition to the direct wireless link 207, a wireline link 208 couples the remote unit 100 to the communication interface 210. The communication interface 210 maintains the connection 208 via a network interface coupled to a public switched telephone network (PSTN) or a network such as the Internet. This connection 208 may itself involve a microwave link, a wireless link through a public switched cellular network or a wireless link in a PCS network.

The communication interface 210 is preferably coupled to a communication server 212. The communication server 212 may be thought of as generalization of a private branch exchange (PBX). The communication server 212 accepts tele-traffic from any variety of sources and provides switchable connections to couple different sources together. For example, the communication server 212 may be implemented as a PBX which receives a set of direct inward dial lines from a central office operated by the public telephone network. The PBX then provides local users with extensions and allows local users to call each other by dialing the last four digits of their telephone numbers. The PBX typically provides an outside line to a user once the user has dialed a nine.

The communication server 212 may also be configured to provide additional types of connections, such as packet based voice and video connections according to the H.323 international standard. In such an embodiment, the communication server 212 provides a gateway function passing calls between the public switched telephone network and a network such as the Internet. The communication server 212 may also provide other communications services such as voice mail, email, fax-mail, call distribution and the like. In systems involving Internet telephony, the communication server may operate only using packet protocols and not include an interface for circuit switched connections.

The communication interface 210 is also coupled to a virtual session server 215. The virtual session server 215 is coupled to a table structure 225 and an application program 220. The table structure 225 is preferably implemented as a software entity and may be located in a memory module within the server 215. The virtual session server 215 may be implemented as a software entity which executes on a hardware platform. The hardware platform of the virtual session server 215 may be designed with an internal architecture similar to the remote unit 100 but is designed to provide a higher computation capacity and to handle multiple users. When supporting a virtual session server, the display monitor 130 is optional as users may control the virtual session server 215 remotely. The control program module 120, when implemented in the virtual session server 215 provides the server side of the communication protocols discussed in connection with FIGS. 3-8. Hence the remote unit 100 and the virtual session server 215 involve similar architectures and respectively implement the client and server sides of a set of virtual-session-related communication protocols of the present invention.

The application program 220 may execute on the same hardware platform as the virtual session server 215. In general, both the virtual session server 215 and the application program 220 may be implemented as software modules running on personal computers, workstations, dedicated custom hardware, mainframe, or file servers. For example, the virtual session server 215 may be implemented as a software module running on an UltaSparc™. workstation or file server from Sun Microsystems Inc. The software may be written to execute over a multitasking operating system such as Solaris™. from Sun Microsystems Inc. or WindowsNT™. from Micrsoft Inc. In a first preferred embodiment, the application program 220 includes a distributed database program running on a collection of networked servers such as Sun UltraSparc™. servers. In a second preferred embodiment, the application program may itself be a communication server as provided by an Internet service provider (ISP).

The system 200 is operative to implement a set of virtual session communication protocols according to the present invention. The remote unit 100 establishes a session via the virtual session server 215 to set up a virtual presence with the application program 220. Preferably, the virtual session server 215 also provides a link to the communication server 212 to provide it access to the virtual session. When the remote unit 100 disconnects from a physical connection 207 or 208, the virtual session is maintained within the table structure 225. When the remote unit 100 later wishes to reestablish communication with the application program 220, the virtual connection server 215 is operative to keep the virtual session active and to allow the user rapid and nearly transparent access to the application program 220. Similarly, the virtual session also preferably is used to provide a virtual communication link between the communication sever 212 and the remote unit 100. In some systems, a first virtual session is established between the remote unit 100 and the application program 220, and a second virtual session is established between the remote unit 100 and the communication server 212. The details of the operation of the virtual session server 215 and the virtual session protocols are discussed below in connection FIGS. 3-8. Before proceeding to these portions of the detailed description, two embodiments of the system 200 are described.

In a first exemplary embodiment of the system 200, a mobile worker such as a home-care professional operates the remote unit 100 to establish and maintain a virtual session with the application program 220. In one embodiment, the application program 220 controls access to a database including complete medical and billing records for individual patients. Depending on working conditions, the home-care professional may require access from a wireless connection such as a cellular connection, or else may be able to communicate via a wireline connection provided within a patient's home. As the home care professional proceeds through a given workflow, the professional will eventually need to communicate with the application program 220. When this time arrives, the present invention is operative to establish a physical connection between the home-care professional and the application program 220. The professional need not be aware the physical connection has not been available since the time the virtual session was first established. The virtual session is maintained by the virtual session server 215 and the protocols of the present invention are employed to ensure such a virtual connectivity is provided without the need for the remote unit 100 to be continuously connected to the application program 220.

In a second exemplary embodiment, the application program 220 is a communication server operated by an ISP. In this example, the remote unit 100 is operated by an Internet user. After the Internet user has remained inactive for a period of time, the connection 208 is terminated. At a later time, when the Internet user clicks on a hyperlink, thus demanding service, a short delay is incurred while the connection is reestablished. The remote unit is provided access without the user needing to reestablish a connection. When the user clicks on a hyperlink, the telephone is rapidly dialed without presenting dialing tones to the user. An authentication packet and a request packet are sent using a low data rate protocol such as one used for line-rate negotiation in modems. The user is authenticated by the server and the request packet is forwarded through the Internet to the Internet site referenced by the hyperlink. While the remote Internet server takes time to respond to the request, a higher line speed is negotiated in the background without burdening the user. Because a home Internet user uses the same analog connection between the user's premises and a network interface, the modem parameters may be preferably saved by the server in the table 225 to accelerate re-negotiation. The user is provided access almost immediately, and the connection is reestablished transparently. Note while this example focuses on an Internet application, the techniques apply to any application whereby a network site is accessed by activating a hyperlink.

As will be discussed below, the virtual session between the remote unit 100 and the virtual session server 215 provides a means to initiate transfers in both an uplink and a downlink direction. The uplink direction is from the remote unit 100 to the virtual session server 215, and the downlink direction is from the virtual session server 215 to the remote unit 100. A virtual session is said to exist between the remote unit and the virtual session server 215. This virtual session may be used to create individual virtual sessions between the remote unit 100 and the application program 220, and between the remote unit 100 and the communication server 212. For example, an uplink connection is established, and when a home Internet user has been inactive for a period, the connection is dropped. As discussed above, the connection is reactivated transparently when the user once again activates an Internet link, as in an Internet browser. In the same example, a user may have an email reader program connected through a virtual session. If an email comes in for the user and the virtual session is in place, the email should be rapidly forwarded to the user. To do this, the user's phone is dialed in a downlink direction dial-out link by the virtual session server 215 via the communication interface 210. The remote unit preferably suppresses the first ring and examines caller identification data. When the caller identification data indicates the calling party is the virtual session server 215, the remote unit 100 automatically picks up the call and in this example, accepts the email. If caller identification is not used, a substitute protocol should be employed to assure that connection has been made to the proper application session defined within the virtual session. The substitute protocol preferably involves sending a packet header at the beginning of a call whereby the packet header contains one or more fields which identify associated the application session. Again, the user need not even realize a connection has been reestablished. Instead, the user receives the email message as though the connection had remained continuously active.

Another type of operation may occur when the user of the remote unit 100 is actively connected to the virtual session server 215 and a call comes in directed to the remote user's extension. At this point the call is preferably converted into packets and is sent to the user over the existing connection. In an alternative embodiment, the physical connection is automatically and temporarily dropped and the call is forwarded to the remote user. The virtual connection to the application is maintained through the virtual server. The communications module 125 preferably analyzes caller-identification data to determine the incoming call is a voice call to cause the optional telephone aspect of the remote unit 100 to ring. More details related to the foregoing system operation are discussed in connection with FIGS. 3-8 below.

The virtual session server 215 is able to maintain an open logon to the application program 220. In one embodiment, the virtual session server 215 executes a client-side software which interfaces with the application program 220. That is, if the application program 220 employs a client-server architecture, the application program 220 will implement a server-side software module which interacts with the client-side software. The server-side program performs database or other server oriented functions, while the client-side software provides a user interface to the user. The remote unit 100 can then control the operations of the virtual session server 215 using standard remote session software. An example of commercially available remote session software is PCAnywhere™. from Semantec Corporation. In another embodiment, the virtual session server executes the client-side software in parallel with the remote unit. In still another embodiment, the remote unit executes the client-side software, and the virtual session server merely provides a connection stream to pass data from the application program 220 to the remote unit 100. When the virtual session is in a deactivated state, the virtual session server emulates the client-side software as needed to maintain an active session with the application program 220 in the absence of the remote unit 100. A wide variety of equivalent techniques may be used to allow the virtual session server 215 to maintain a pointer or re-entry point into the application 220 while acting as a proxy agent to maintain the logon for the remote unit 100. A table structure is preferably used to allow the virtual session server to simultaneously maintain a plurality of logons for a plurality of different remote units.

In some embodiments, the remote unit 100 may need to maintain a plurality of virtual sessions with a plurality of different virtual session servers. For example, an independent contractor may provide home-care services for two distinct health regions. Each health region may use a separate database. The remote unit 100 may then access these separate databases using a first and a second client-side application software module. During the course of a day, the remote unit may need to activate the first or the second client-side application software modules. In such case the remote unit 100 is operative to maintain a table structure similar to the table structure 225. The table structure maintained by the remote unit links an application software module through an application session to a virtual session. When the first client-side application program demands access to a first database, the virtual session layer software 154 in the remote unit causes a physical connection to be established to support virtual session communications 182 with the first database application program. Likewise, if the second client-side application software module desires to access a second database, the virtual session layer software module 154 activates a physical layer connection back to the second database server. In other applications a single application program may be used which accesses information on more than one virtual session server. In such case a single application program can select the virtual session to activate based on the communications request generated from within the application program. In still other embodiments, a single physical connection 208 or 207 may be used to communicate with the communication interface 210. The communication server 212 then forwards packets to a first local virtual session server such as the virtual session server 215. If the received communication packets are destined for a second virtual session server, then the communication server 212 preferably forwards the packets to a remote virtual session server using a network connection such as an Internet connection.

Figure 3:
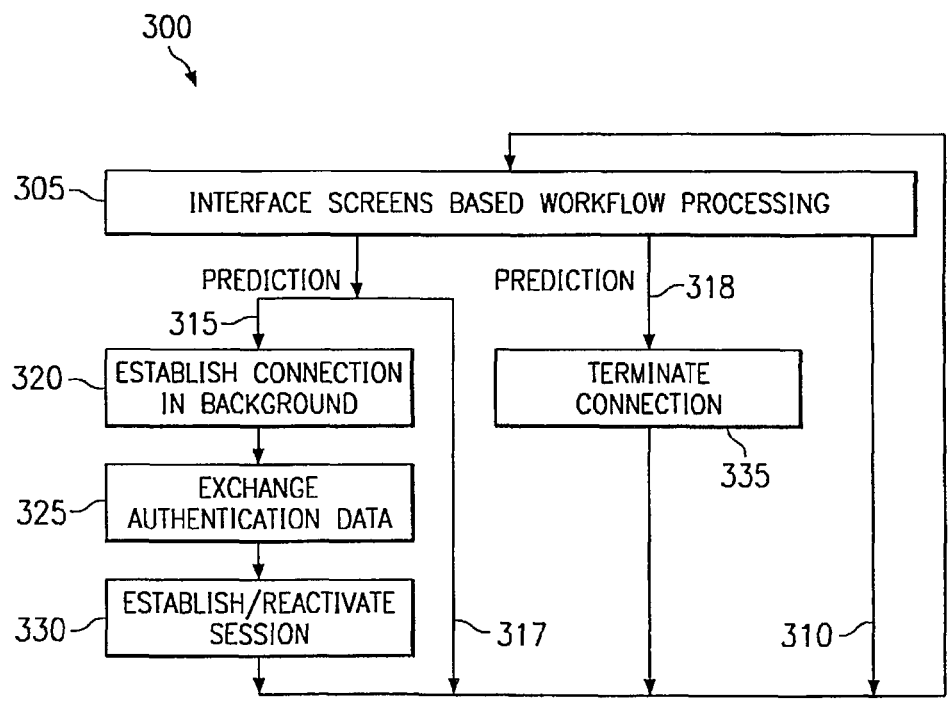
FIG. 3 is a flow chart illustrating a method of processing whereby an application program implementing a workflow provides a prediction of when the user will need a connection and establishes a connection in the background just before it is needed.

Referring now to FIG. 3, a method 300 is illustrated to show how the remote unit 100 preferably operates to activate a connection. The method 300 is preferably practiced by the remote unit 100 in support of a virtual session with the virtual session server 215. A first step 305 of the method 300 involves actions within a workflow process 305. The workflow process 305 includes the step 305 of the method 300 and also performs other activities to interact with a user's workflow requirements. Control loops from the first step 305 back to the first step 305 via a control path 310. The workflow, as discussed above, is preferably made up of a menu system and/or a set of interactive screens traversed by a worker in performing a set of tasks. For example, a home-care professional's workflow involves accessing and displaying a patient's medical record, entering a set of data into the medical record, and performing tasks indicated by the doctor's directions as annotated in the medical record. In this example, as the home-care professional moves from one screen to the next, control loops via the control path 310. The workflow process 305 is an application program which executes on the CPU 105. The workflow process 305 is preferably implemented as a process running on the CPU 105 in a multitasking operating environment. A multitasking operating environment is one in which multiple programs or processes may execute in parallel by sharing time slots within the CPU 105. Multitasking operating system software is well known and is readily available. In a multitasking-programming environment a first process may execute in a normal fashion and provide an interface to a user. At the same time a second process may be executed by sharing CPU cycles without the user's intervention or knowledge. In such a case the second process is said to be a background process or is said to perform background processing. At some point in the course of the workflow, a physical layer communication connection will be needed to communicate information between the remote 100 and the application program 220.

When a step in the workflow process 305 is performed leading up to the need for a physical layer communication connection, control next passes from the first step 305 to a second step 320 via the control path 315. The control path 315 is activated when the workflow process 305 provides a prediction indicating a physical layer communication connection will subsequently be needed. In some cases the prediction may be provided right when the physical layer communication connection is needed. In other cases, the prediction 315 may be used to initiate background processing to download data which will not be needed until a later time. In menu based systems, the prediction 315 may be learned by observing the workflow habits of a user. The prediction 315 is a function of the application program or workflow 305 and is optional. In the second step 320, a connection is established in the background. Background processing enables the user to continue interacting with the workflow process 305 while a physical layer communication connection is simultaneously and transparently established. That is, the physical layer communication path is reestablished without inhibiting the user from interacting with the workflow 305. Hence when control passes via the control path 315 to the step 320, control preferably simultaneously passes via the control path 317 back into the workflow. The background process is preferably forked as a separate task and two execution flows proceed in parallel by time sharing the CPU 105. Multitasking is well known in the art and is implemented using interrupt based processing. In alternative embodiments the control path 317 may be deleted and a single control flow may be implemented using the control path 315. However, this embodiment may require the user to wait for the connection to be established and is hence not deemed to be the preferred embodiment of the method. Other equivalent embodiments set up the communication path transparently by multiplexing the CPU 105's computation cycles from within the workflow process or some other process.

Once control has been forked via the control path 315 to the second step 320, a dialer within the communications module 125 preferably dials to establish a physical layer communication connection with the communication interface 210. In embodiments using dedicated radio links, the connection may be established over the wireless link 207. One preferred embodiment of a remote unit 100 incorporates a cellular radio. In this case the dialer dials a telephone number and a connection is established using a public switched cellular telephone network so that the connection is set up on the link 208. Stationary Internet based embodiments perform the second step 320 by dialing a telephone number using an automatic dialer which dials a land line connection for a modem. In all cases, it is preferred to suppress the dialing tones and line-rate negotiation signals so the connection may be established transparently to the user.

Control next passes from the second step 320 to a third step 325. In the step 325, an authentication code is transmitted from the remote unit 100 to the communication interface 210. This authentication code is then passed to the virtual session server 215. The virtual session server evaluates the authentication code to determine if access is to be permitted. In a preferred embodiment, the authentication code involves a digital signature as is known in the field of public key cryptography. In a preferred embodiment, all transmissions are encrypted using public key cryptography. Some systems may be implemented using various encryption standards such as secure sockets layer based encryption. The amount of authentication and encryption used in any given embodiment is left to the system designer, but preferably all transactions are encrypted as described above.

Control next passes from the third step 325 to a fourth step 330. In the fourth step 330, a session is established/reactivated with the virtual session server 215. The session is established the first time the method 300 passes control to the step 330. Subsequently the step 330 is operative to reactivate the session with the virtual session server. When the session between the remote unit 100 and the virtual session server 220 is reactivated, virtual session communications resume. At this point, the virtual session server 215 correlates information stored in the table structure 225 with the connection and provides the remote unit 100 access to the application program 220. If no data is stored in table structure 225, access is provided to a default logon screen allowing remote unit 100 to establish a new application session. The virtual session server 215 then populates the table structure 225 to establish a virtual session. The step 330 involves setting up a stream connection between the workflow process 305 and a protocol stack. The protocol stack is operative to read information bits from the stream connection and communicate the bits across an external communication link. Bits received over the external communication link are converted by the protocol stack into information bits to be sent back to the workflow process 305 across the connection stream. Once the appropriate communication processes are configured, control next passes back to the workflow process 305. Due to the aforementioned forking operation, the passing of control back to the workflow process 305 may have already occurred via the control path 317. In this case the passing of control from the step 330 to the workflow process is not explicitly performed.

When control loops back from the fourth step 330 to the workflow process 305, a physical layer communication connection is activated for current or subsequent communication. When the user gets to a point in the workflow where communication with the application program 220 is needed, the connection has already been transparently set up in the background. Hence the user gets the feel of being connected to the application program 220 all the time, where in fact the remote 100 is connected via a physical channel to the application program 220 only a fraction of the time. This virtual connection saves communication resources and money when a toll is charged based on the amount of usage on the link 207 or the link 208. In some embodiments, the fourth step 330, or an execution thread within the workflow 305 is operative to upload or download information in the background. This way the user has ready access to data contained in the application program 220, but in general a shorter connect time is required. While with prior art systems it is burdensome for a user to connect to a central server and download and upload information, with the virtual session of the present invention the user need not even be aware this process is occurring. Rather the user feels as though he or she is continuously connected with a fast connection because the data needed at a given point in the workflow is already available locally or has been uploaded in the background transparently without user intervention. In systems where server synchronization is an issue, file semaphores and/or direct active sessions not employing uploading and/or downloading of records may be used.

Based on another point in the workflow, another prediction is made to predict when the communication channel will not be needed for some time. For example, it may be known, based on the workflow, the home-care professional will next perform a sequence of tests and enter data into a screen displayed on the remote unit. Only at a later time will the workflow come to a point where this information is to be uploaded to the application program 220. When such a prediction is made, control passes from the first step 305 via the control path 318 to a fifth step 335. The fifth step 335 is operative to deactivate the connection established over the link 207 or the link 208. The step 335 may optionally involve forking a separate execution thread or otherwise accessing a separate process in a multitasking environment. Alternatively, the fifth step 335 may be performed by executing a set of instructions in the workflow process 305. At a later time, a prediction may be made indicating the link 207 or 208 needs to once again be activated, whereby control again passes over to the second step 320 via the control path 315. It should be noted different systems will typically set their prediction times according to the economic conditions involved. For example, in some systems the first minute of connection time may cost five times as much as all subsequent minutes. In this case predictions would be preferably set according to a criterion to minimize cost by not establishing and terminating connections more often than necessary. If a flat rate were charged per minute connections would be set-up and terminated more often. If automatic uploading and downloading is performed in the background, a very efficient use of air-time can often be achieved while presenting the user with the appearance of being continuously connected to the application program 220.

Figure 4:
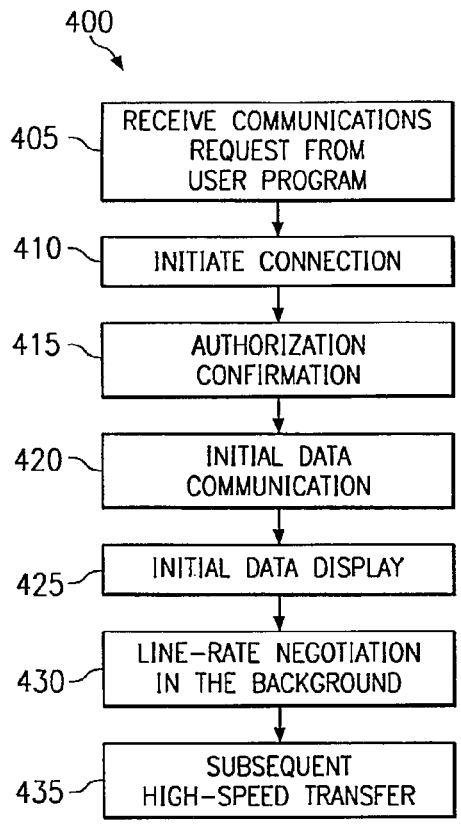
FIG. 4 is a flow chart illustrating a method of establishing communication with a remote entity with a near-immediate set up time.

Referring now to FIG. 4, a method 400 of establishing a communication link with low delay is illustrated. The method 400 may be practiced by both the remote unit 100 and the communication interface 210. This method is most applicable to systems involving modems whereby digital data is transferred over an analog channel requiring receiver training. Receiver training involves transmitting data sequences through a channel and allowing a receiver to adjust its receiver parameters. Receiver parameters include echo canceller and equalizer filter coefficients. Most systems also adjust their data rates and signal constellations based on observed conditions. In modems, this entire process is known as line-rate negotiation. Prior art systems involving receiver training are tedious to use because they force the user to wait while the receiver is trained. Most systems play the training signals though a speaker to allow the user to hear the training process. This lets the user know what the computer is doing for the duration of the delay. The method 400 improves upon this prior art solution by allowing the user to gain almost immediate access without a significant delay.

In a first step 405, a protocol stack or other process practicing the method 400 receives a communications request from a user program. For example, this occurs when a user clicks on an icon to initiate the establishment of an Internet connection. Control next passes to a step 410 where the connection is initiated. This step typically involves an automatic dialer dialing the number of an Internet service provider (ISP). The ISP software may be implemented as a communication server application corresponding to the application program 220. In this case access to the application program is governed by the virtual session server 215.

Control next passes from the second step 410 to a third step 415. In the third step 415 an authorization sequence is exchanged. In a preferred embodiment public key cryptography involving digital signatures and keys is used. Embodiments involving a virtual session server 215 either set up a session or activate an existing session during the third step 415. Control next passes from the third step 415 to a fourth step 420. In the fourth step 420, one or more initial application layer data packets are transmitted across the connection using a low speed protocol. A low speed protocol is used by the transmitter and receiver when performing line-rate negotiations. For more details of line-rate negotiation protocols, see, for example, the V.34 and V.90 standards from the International Telecommunications Union. In the present invention, the low speed protocol is used to transmit application layer data before the line-rate negotiation procedures have completed. This avoids the need for the user to wait for line-rate negotiation to complete before being able to access a communication path.

Control next passes from the fourth step 420 to a fifth step 425. In the fifth step 425, initial data is displayed. Software located locally in the remote unit 100 preferably contains high-volume graphics related data so that the initial data exchange of the step 420 only requires a small amount of data to be transferred. For example, the user logs onto the Internet and almost immediately sees a screen of information indicating the user is connected and the system is ready to accept inputs. This is made possible by displaying locally held screens of graphical data and allowing a small amount of specific information such as time, date, and headlines to be received and displayed. If the user then immediately clicks on a link, an application layer request packet is sent using the line-rate negotiation protocol's data format. This allows the user to immediately begin making requests before the line-rate negotiations have completed. In many cases the user will pause and read the headline information, giving the system even more time to perform line-rate negotiation in the background.

Control next passes from the fifth step 425 to a sixth step 430. In the sixth step 430, a background process is forked to perform line-rate negotiation. Line-rate negotiation is allowed to proceed in the background while the user is reading the information provided on the initial display of the step 425. Likewise, if the user had rapidly clicked on a link, a request packet is sent out and while the server is responding to the request, the background line-rate negotiation may proceed. The step 430 is operative to perform line-rate negotiation so as to set up a high-speed connection for subsequent higher volume data transfers. In embodiments involving a virtual session server 215, the user's line speed parameters may be stored in the table structure 225. For example, if the user is an Internet user and the application program 220 is an ISP, the user will often dial in from the same location. Thus parameters derived in a previous activation of a communication channel will be either identical or similar to those used in a current activation. Hence the sixth step 430 optionally involves accessing from the table 225 a set of starting parameters derived from the activation of the communication channel. If communication is needed before the line-rate negotiation has completed, communication preferably proceeds at the highest rate negotiated up to that point.

Once the line-rate negotiation process of the step 430 has completed, control passes to a seventh step 435. In the step 435, communication is able to proceed at full speed. In most cases where this method is implemented, the user will get the full benefit of being connected almost immediately without the normal delay associated with prior art systems. This is so because initial low-volume data is allowed to pass through the channel before the line-rate negotiation has completed. Line rate negotiation then proceeds in the background in parallel with other activities such as the user reading headline information or a distant server accessing data and responding to the initial data request packet sent across the Internet. This technique is useful when a user is maintaining a virtual session with a remote server because it is imperative to allow the user to appear to be connected without having to experience delays when accessing data. The method 300 and the method 400 may be performed together in a complementary fashion to make the virtual session appear to be constantly available.

The method 400 may be practiced by the remote unit 100 and the virtual session server 215. When the remote unit 100 initiates the method, the virtual session server 215 executes steps 410, 415, 420, 430 and 435. When the virtual session server 215, the application program 220, or the communication server 212 initiates the method, one or a combination of these servers practice the steps 405, 410, 415, 420, 430, and 435. The first step 405 involves, for example, receiving a communication request such as a telephony call or an email for the remote unit 100. In some systems, the first step 405 may involve a request generated from within the application program 220.

Figure 5:
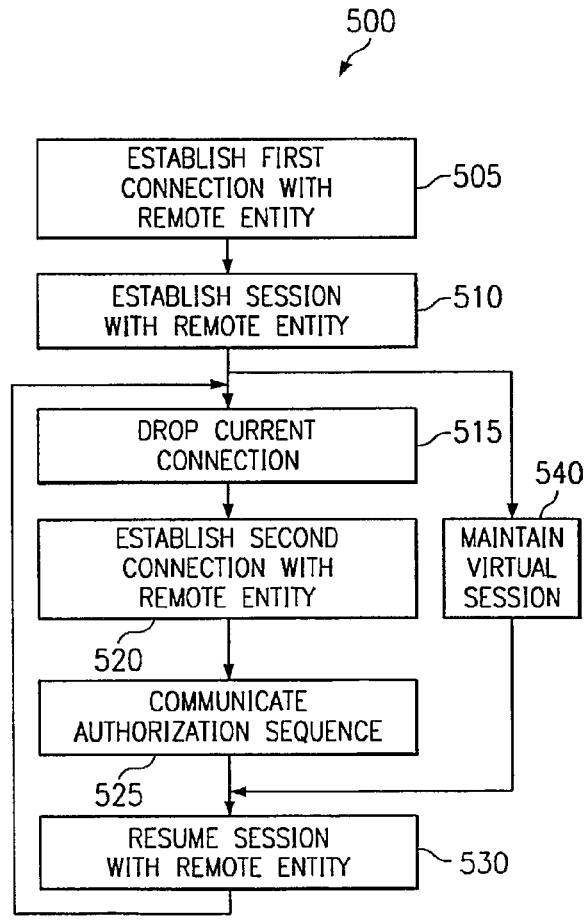
FIG. 5 is a flow chart illustrating a method of communicating by maintaining a virtual presence without the need to continuously maintain a physical connection.

Referring now to FIG. 5, a method 500 of establishing and operating a virtual session is illustrated. For example, the method 500 establishes a virtual session between the remote unit 100 and the virtual session server 215. The method 500 is practiced by both the remote unit 100 and the virtual session server 215. In a first step 505 a first physical layer communication connection is established with a remote entity. If the method is practiced by the remote unit 100, then the remote entity typically corresponds to the virtual session server 215. The virtual session may be used to support virtual sub-sessions between the remote unit 100 and the application program 220. Also, a virtual sub-session may be established between the remote unit 100 and the communication server 212. For the purposes of discussion herein, all of these virtual sessions will be referred to simply as virtual sessions. If the method 500 is practiced by the virtual session server 215, then the remote entity typically corresponds to the remote unit. The step 505 may be activated according to the prediction 315, and the step 505 may use the method 400 to allow the connection to be set up with very low delay.

Control next passes from the first step 505 to a second step 510. In the second step 510 a session is established with the remote entity. In a preferred embodiment, this involves exchanging password information and agreeing upon a set of keys to encrypt data transacted in the session. Also, the virtual session server 215 preferably sets up a table entry in the table structure 225. The table entry indicates the presence of a virtual session. The table entry may include modem parameters as discussed in connection with FIG. 4. Also, the virtual session as set up in the table entry links the remote unit to a user identification and a password as presented to the application program 220. For example, a user name and a password may be used as user authentication parameters. Preferably public key encryption is used to encrypt all information so the password sent from the remote unit 100 to the application program 220 cannot be effectively intercepted. The remote unit 100 also preferably sets up a virtual session data structure to hold similar information related to the virtual session. Once the virtual session has been set up, the remote unit 100 may access the application program 220. Also, the remote unit 100 may optionally access the communication server 212 for communication services.

Control next passes from the second step 510 to a third step 515. In the third step 515, the physical connection established in the first step 505 is dropped. Meanwhile the virtual session data structures and table entries established in the second step 510 are retained. The session is allowed to proceed while no physical layer connection exists. That is, the step 510 is operative to set up a table structure including one or more data structures which allows a virtual session to be maintained in memory while other activities occur. Hence a passive background thread of execution passes from the step 510 to a passive step 540 whereby the virtual session is maintained. This allows the remote unit 100 to stand by or be used for steps of the workflow process 305 not requiring communication with the application program 220. Once the user needs to communicate with the application program 220, or when a prediction 315 is made, control next passes from the third step 515 to a fourth step 520. The step 520 is operative to reestablish a second physical layer communication connection to allow communication to proceed once again using the session established in the second step 510. This connection reestablishment may be performed in response to the prediction 315 and may use the low-delay connection establishment technique of the method 400.

In some embodiments, the present invention involves using distinct and separate communications media to perform the step 505 and the step 520. For example, a mobile worker may call in from home to set up the virtual session in the step 510 using the first physical layer communication connection established in the step 505. Later in the day, the worker may call in from a restaurant while catching up on some records keeping. This second use of the virtual session involves use of the second physical layer communication connection which in this example is a wireless connection different from the landline connection used to initiate the session from home earlier in the day. At a still later time, the worker may call in from a patient's home via a third physical layer communication connection while performing home-care services. If modem starting parameters have been stored in table 225, they are preferably updated whenever the communication connection is changed. Hence the virtual session of the present invention enables a mobile worker to continue communications via the most expedient and/or economical means without causing the user to have to reestablish a communication connection. Preferably, when the remote unit 100 is connected to a communications source via the connector 127, the remote unit 100 automatically detects this connectivity and makes use of it for subsequent virtual-session communications. That is, the present invention contemplates the availability of various forms of "pigtail" connectors being available so the remote unit 100 can operate in a "plug-and-play" fashion. Pigtails may be supplied to allow the remote unit to connect to the PSTN, the Internet, or to another computer via a universal serial bus, for example.

Control next passes from the fourth step 520 to a fifth step 525. In the fifth step 525 an authorization sequence is exchanged. This is preferably implemented using public key encryption and digital signatures. Some embodiments may be developed which do not implement the fifth step 525, but preferred embodiments do make use of user authentication. After the fifth step 525 has completed, the session is resumed in a sixth step 530. Over the course of the virtual session, control may loop back to the third step 515 as many times as the virtual session is activated with a new physical connection. When the sixth step 530 is entered, the virtual session is once again activated so that the passive step 540 also passes control to the sixth step 530. In a minimal implementation of the method, no looping occurs and the method terminates after the first pass through the sixth step 530.

Referring now to FIG. 6, a method 600 practiced by the virtual session server 210 is illustrated. In a first step 605, a first physical layer communication connection is established for communicating with the remote unit 100. Control next passes to a second step 610 whereby a set of authorization parameters are accepted and authenticated. As discussed in connection with FIG. 5, the authentication parameters preferably include the exchange of public keys which include a digital signature in accordance with public key cryptography. Control next passes to a third step 615 where a user identification and a password are passed by the virtual session server 215 to the application program 220 on behalf of the remote unit 100. As discussed in connection with FIG. 5, the user identification and the password to be presented to the application program 220 are preferably transmitted in encrypted form. Once the application program 220 authenticates the user identification and password needed to gain access, the virtual session server 215 enters an entry into the table structure 225 to hold a set of session parameters. The session parameters include the user identification, a session identifier, encryption data and possibly other data such as modem starting parameters. Once the session has been logged into the table, the user may use it to communicate with the application program 220.

Control next passes from the fourth step 620 to a fifth step 625. In the fifth step 625 the physical layer connection is dropped. This step is performed when the remote unit does not currently require communications with the application program 220. In step 650 the virtual server maintains the application session while the physical connection is disconnected. At a later time, when the user needs access to the application program or when the prediction 315 is made, control next passes to a sixth step 630. In the sixth step 630 a second physical layer connection is established to allow communication between the remote unit 100 and the application 220 to resume. As discussed in connection with FIG. 5, the second physical layer connection may involve a different communication path and/or medium as was used for the first physical layer connection. That is, a plurality of communications media are preferably supported to allow the user to call in via different means, for example via a wireless or a wireline connection. The step 630 may be initiated due to actions at the remote unit 100 or in response to events occurring in the server. For example, the communication server 212 may receive a call for the remote unit. Alternatively an email may be received which needs to be forwarded to the remote unit. In such a case, the sixth step 630 optionally involves sending a caller identification packet to let the remote unit know what type of communication, such as a voice telephony call, an email, or a fax, is inbound. A caller identification packet is a sequence of information bits sent across a communication connection identifying the calling party of the connection. In standard telephone systems, the caller identification packet is transmitted between the first and second rings when the telephone call is being set-up. More details relating to communications initiated by the virtual session server 215 back to the remote unit 100 are discussed in connection with FIG. 7.

Once the second physical layer communication connection is established in the sixth step 630, possibly according to the method 400, control next passes to a seventh step 635. In the seventh step 635, authorization codes are verified similarly to the second step 610. Once the user codes have been verified to be correct, control next passes to an eighth step 640 whereby communication once again resumes using the previously established virtual session.

Referring now to FIG. 7, a method 700 of processing communication requests in a virtual session is illustrated. This method is preferably practiced by the virtual session server 215 simultaneously with the method 600. In a first step 705 a virtual session is established between the virtual session server 215 and the remote unit 100 as discussed in connection with FIGS. 5 and 6. At some later time, while the virtual session is active, the communication server 212 receives an incoming communication request for the remote unit 100. Because the virtual session server 215 practices the method 500 and/or the method 600, depending on the time of arrival of the communication, the remote unit 100 may or may not be physically connected to the virtual session server 215 by a physical communication link. Hence when the communication is received, control passes from the step 705 based on a decision 710 which determines whether a physical connection currently exists to the remote unit 100.

If the virtual session is presently in a state whereby the physical connection has been disconnected, control passes from the first step 705 to a second step 715. In the second step 715 the communication request is accepted by the communication server 212 through a direct connection or via the communication interface 210. Control next passes to a third and optional step 720 whereby a specific caller identification packet is associated with the communication type. For example, if the communication involves a telephone call a first caller identification packet is sent identifying an extension used for telephone calls. If the communication involves an email, a second caller identification packet is sent identifying an extension used for email. On the other hand, if the communication comes from the application program 220, still another caller identification packet is sent. When this optional use of a caller identification packet is employed, the remote unit 100 has the information needed to properly and immediately respond to an incoming call as discussed in connection with FIG. 8. If a call is received by the remote unit from a source other than the virtual connection server 215, the caller identification information will identify the call as not being associated with the virtual session. Control next passes to a fourth step 725 whereby an automatic dialer responds to communication requests and the communication is forwarded to the remote unit 100.

Another situation arises when the communication request arrives while the remote unit 100 and the virtual session server 215 are currently connected by an existing physical channel. According to one mode of processing, control stays in the first step 705 while communication proceeds in an active phase of a virtual session. When the communication request arrives, the communication server 212 signals to the virtual session server that a new call has arrived for the remote unit 100. The virtual session server then causes the existing physical layer communication connection to be dropped and thus control passes from the first step 705 to the second step 715 as in the foregoing discussion. In another mode of processing, the existing physical layer communication connection is left in tact and control passes from the first step 705 to a fifth step 745. In the fifth step 745, the communication is packetized, and in a sixth step 750 the communication packets are passed along the existing physical layer communication connection. Control continues to loop back from the sixth step 750 to the fifth step 745 during the course of the communication. In this mode of operation the existing physical layer communication connection is shared to provide the remote user with a means to stay connected to the application program 220 and communicate at the same time. In this case the physical layer is time shared by the virtual session to allow multiple modes of communications to proceed in parallel.

Note the method 700 provides the user of the remote unit 100 with a virtual presence in the work place while actually being remote. Independent of whether the remote unit is presently actively connected to the virtual session server, the communication request may be forwarded to the remote unit 100 making the remote user appear to be present in the office at all times. The only time the remote unit 100 would not be reachable is when it is engaged in a communication with an entity other than the virtual connection server. This problem may be mitigated by allowing the remote unit to only be reachable through the access number provided by the communication server 212. If a call is placed from the remote unit to another point, this call too may be routed through the communication server 212. Systems which do allow the remote unit to make calls outside the virtual session may preferably employ voice mail at the communication server 212. When the remote unit again becomes available, the virtual session server 215 may forward the communication to the remote unit according to the method 700. Remote units may also be designed using call-waiting concepts whereby the virtual session may be re-activated by interrupting another call.

Referring now to FIG. 8, an optional method 800 practiced by the remote unit 100 is illustrated. This method is practiced when a virtual session exists, the remote unit and the virtual session server are presently not connected via a physical channel, and a communication request is to be forwarded to the remote unit 100. In a first step a first ring signal is detected. Optionally, the first ring signal is suppressed so the user will not hear it. In some systems a vibrational first ring signal may be allowed to pass through to notify the user of an incoming communication. In still other embodiments, the remote unit may be programmed to sound a normal ring on the first ring signal. In some embodiments the ring signal will not be a traditional telephone ring signal but will in general be any signal indicative of an incoming communication request.

In current systems, a caller identification packet is presented to the called party after the first ring signal. Hence identification of the calling party becomes available at this time. After the first ring signal, control passes from the first step 805 to a second step 810. In the second step 810, the caller identification information is evaluated. Note it would be preferable to accept the caller identification data before the first ring, and the present invention contemplates systems whereby the virtual session server 215 signals to the PSTN to provide a caller identification packet before the first ring. This service does not appear to be available from telephone service providers at this time. Embodiments also comprehended by the present invention include systems whereby the remote unit 100 immediately picks up an incoming call and caller identification information is sent by the virtual connection server 215 over the connection identifying the call-type. During the second step 810, the caller identification packet is evaluated. As discussed in connection with the third step 720 of the method 700, the virtual session server 215 sends out a caller identification packet to identify the type of incoming call. For example, different caller identification packets indicate whether the incoming call is an email, a voice telephone call, or a communication from the application program 220.

Control next passes from the second step 810 to a third step 815. In the third step 815, an application layer program is selected to process the incoming call. In the foregoing examples, an application may be launched to accept an email message, a voice telephone call, or to accept a communication from the application program 220. If the communication is an email, it may be desirable to pop a mailbox icon on the screen or to produce a speech signal stating "you've got mail." If the incoming call is a voice call, it may be desirable to allow the telephone to ring like a normal telephone. If the communication is from the application program 220, it may be desirable to update data located in the screens of the workflow or otherwise signal the presence of new data. Once the appropriate application has been launched to handle the incoming communication, control next passes to a fourth step 820 whereby communication session is reactivated and the communication is processed. For example, one or more packets of information may be received and related information such as an email message may be displayed. Also, a telephone call may be allowed to proceed or a set of information may be downloaded from the application program 220.

Although the present invention has been described with reference to specific embodiments, other embodiments may occur to those skilled in the art without deviating from the intended scope. For example, other forms of communications such as fax messages may be accepted and displayed by the remote unit 100. Also, the present invention may be used for applications other than mobile workers and Internet users. Virtual sessions according to the present invention are applicable to any situation where a continual connectivity is required but the cost to remain continuously connected is high. Vehicle computers with cellular radio based Internet connections are an example. In such systems, the remote unit 100 may be a vehicle-mounted computer or may include a connection to a vehicle-mounted computer. Also, virtual sessions according to the present invention are applicable to any situation where the user should not be burdened with the need to upload and/or download data and go through connection and disconnection procedures. Therefore, it is to be understood that the invention herein encompasses all such embodiments which do not depart from the spirit and scope of the invention as defined in the appended claims.

In an embodiment, a remote unit is provided, the remote unit comprising a central processing unit operatively coupled to a bus; a memory operatively coupled to the bus; a display monitor operatively coupled to the bus; a communications module operatively coupled to the bus; a control program module controllably coupled to the central processing unit and operative to cause the central processing unit to display a user interface to a user via the display monitor, the control program further being operative to cause the processor to establish a first virtual session with a first remote entity using a first physical communication connection is provided.

In another embodiment, the first remote entity is a communication interface coupled to a virtual session server, the virtual session server providing access to an application program via the virtual session. The remote unit may further comprise a table structure, the table structure comprising a plurality of data structures, the plurality of data structures comprising a first data structure and a second data structure, the first data structure comprising information relating to the first virtual session, and the second data structure comprising information relating to a second virtual session with a second remote entity; wherein the control program module is operative to selectively reactivate one of the first virtual session and the second virtual session in response to a communication request from the user. Alternatively, the remote unit may further comprise a table structure, the table structure comprising a plurality of data structures, the plurality of data structures comprising a first data structure and a second data structure, the first data structure comprising information relating to the first virtual session, and the second data structure comprising information relating to a second virtual session with a second remote entity; wherein the control program module is operative to selectively reactivate one of the first virtual session and the second virtual session in response to a communication request received via the communications module.

In another embodiment, the first remote entity is a communication interface coupled to a virtual session server, and the remote unit maintains a virtual presence with the virtual session server by communicating using any of a plurality of communication types via the virtual session. The plurality of communication types may include voice telephony and email.

In yet another embodiment, the control program is further operative to disconnect from the first physical communication connection, present a workflow to the user and predict, based upon the workflow, when external communication will be required, the control program further being operative to cause a second physical communication connection to be established based upon the prediction, the second physical communication connection providing a physical layer connection for the virtual session. The control program may be further operative to predict, based upon the workflow, when information is to be uploaded and/or downloaded to and/or from the first remote entity, and to cause the information to be uploaded and/or downloaded in the background using the second physical communication connection. The second physical communication connection may be established transparently without inhibiting the user interface from supporting the workflow. The user interface may implement a workflow by presenting a sequence of interactive screens on the display monitor.

In yet another embodiment, the control program is further operative to drop the first physical connection, cause a second physical communication path to be established, and communicate application layer data via the virtual session using the second physical connection before a line-rate negotiation associated with the second physical connection has completed.

In another embodiment of the present invention, a virtual session server is provided, the virtual session server comprising a first coupling to a communication interface the first coupling providing access to a physical layer connection to a remote unit; a table structure, the table structure operatively coupled to receive information from the first coupling, the table structure storing parameters relating a communication session; a second coupling to an application program, the second coupling comprising a communication path whose access requires a user authentication parameter; and a control program module controllably coupled to the first coupling, the table structure, and the second coupling, the control program module operative to establish an application session for use between the remote unit and the application program, store a parameter relating to the application session in the table structure, and maintain the application session in both the presence and absence of the physical layer communication connection, such that the application session is continuously activated both when the physical layer communication path is in a connected state and a disconnected state.

In another embodiment, the control program module is further operative to accept from the remote unit a user authentication parameter when the physical layer connection transitions from the disconnected state to the connected state, and provide a communication path for whereby the remote unit is able to access the application program using the application session.

In another embodiment, the virtual session server further comprises a third coupling to a communication server, whereby the control program module is further operative to accept a communication request from the communication server to be forwarded to the remote unit, and if a physical layer communication connection is present, the control program further operative to activate a second application session, the second application session between the remote unit and a communication program responsible for the communication request. The control program may issue a signal indicating to convert a media stream related to the communication request into a packet stream to be routed via the second application session. Upon reception of the communication request, if no physical communication connection is presently active, the control program may be further operative to process the communication request by dialing out to establish an active physical connection and to then activate a second application session, the second application session between the remote unit and a communication program responsible for the communication request.

In another embodiment, activation of the physical layer communication connection, application layer data is transmitted via the physical layer communication connection prior to the completion of a line-rate negotiation associated with the physical layer communication connection.

In another embodiment, different connections of the physical layer communication connection use distinct communications media.

In another embodiment of the present invention, a client-server system is provided, the client-server system comprising a remote unit comprising a control program module, the remote unit operative to maintain a virtual session; a virtual session server, the virtual session server operatively coupled to a communication interface via a first coupling, the communication interface coupled to the remote unit by at least one communication link, the communication interface providing a data stream including information received from the communication link, the virtual session server operatively coupled to an application program via a second coupling; a table structure, the table structure including a link to a data structure, the data structure including a plurality of bits arranged to represent information relating to an communication session between the remote unit and the virtual session server; and a control program module controllably coupled to the virtual session server, the table structure and the application program, the control program module operative to cause the virtual session server to establish an application session for use between the virtual session server and the application program, store an application session parameter in the data structure and to link the data structure into the table structure, and maintain the application session in both the presence and absence of the physical layer communication connection, such that the application session is continuously activated when the physical layer communication path is in a connected state and a disconnected state.

In another embodiment, the control program module is further operative to cause the virtual session server to execute a client-side application software module on the virtual server under remote control of the remote unit.

In another embodiment, the control program module is further operative to cause the virtual session server to execute a client-side application software module on the virtual session server in parallel with the remote unit; and maintain a presence with the application program while the physical layer communication path is in the disconnected state.

In another embodiment, the control program module is further operative to cause the virtual session server to maintain a communication path and grant the remote unit access to the application program via the communication path after the physical layer has been placed into the connected state.

In another embodiment, the control program module is further operative to cause the virtual session server to grant the remote unit access to the application program via the communication path only after a virtual session authentication procedure has been successfully completed.

In another embodiment of the present invention, a method of accessing a central server from a remote unit is provided, the method comprising the steps of presenting a workflow to a user via a user interface; predicting, based upon the workflow, when the user will require connectivity to the central server; and based upon the prediction and in the background, initiating the establishment of a physical layer communication connection to the central server.

In another embodiment, the physical layer connection is established to support a virtual session and the remote entity comprises a virtual session server.

In another embodiment, the method further comprises the steps of making a second prediction, based upon the workflow, the second prediction indicating when information is to be uploaded and/or downloaded to and/or from the central server; and based upon the second prediction, causing the information to be uploaded and/or downloaded in the background using the physical layer communication connection.

In another embodiment of the present invention, a method of establishing a connection with a low connection set-up time is provided, the method comprising the steps of initiating the establishment of a communication connection to be used to communicate with a remote entity; communicating application layer data via the communication connection prior to the completion of a line-rate negotiation; and in the background, negotiating a line speed for subsequent high-speed communication.

In another embodiment, the method further comprises the steps of receiving an input, the input indicative of a request to communicate with a remote entity; and transacting an authorization sequence with the remote entity.

In another embodiment, the input may be received by a user interface and the input may be indicative of a command to, access a network site using a hyperlink. Furthermore, the method may comprise the step of resuming the use of a virtual session via the communication connection.

In another embodiment, the step of initiating may be performed in response to a ring signal received from the remote entity.

In another embodiment of the present invention, a method is provided, the method comprising the steps of establishing a first connection to a remote entity; using the first connection to establish a set of parameters needed to define a communication session with the remote entity; disconnecting the first connection and maintaining the parameters related to the communication session; establishing a second connection to the remote entity; communicating an authorization sequence with the remote entity; and reactivating the communication session using as a communication path the second connection.

In another embodiment, the step of using further comprises the steps of accepting a user authentication parameter and passing the parameter to an application program to establish an application session; and linking into a table structure a data structure associating the remote unit with the application session, the data structure thereby providing an access by the remote unit to the application program upon reactivation of the communication session.

In another embodiment, the first and second connections involve distinct communications media. The set of parameters may be stored in a table, and the table may hold a plurality of such sets of parameters and maintains a plurality of communication sessions with a plurality of remote entities. The method may further comprise the steps of converting a communications media stream to a packet stream and multiplexing the packet stream via the application session over the communication session. Alternatively, the method may further comprise the steps of disconnecting from the second connection while maintaining the communication session; initiating the establishment of a third connection; and processing the communication request by forwarding a communications media stream via the communication session using the third communication connection.

In another embodiment, the method further comprises the steps of evaluating a header received over the second physical layer communication connection to determine an application program to process information transacted on the second connection; and based upon the evaluation, launching the application program to communicate via the second connection.

In another embodiment, a method of providing a virtual presence of a remote unit with a central server is provided, the method comprising the steps of establishing a communication session with the remote unit using a first physical layer communication path and dropping the first physical layer communication connection; configuring a data structure, the data structure linking the communication session to an application session; accepting a communication request from the application program, the communication request requiring a physical layer communication path to the remote unit; dialing-out to establish a second physical layer communication path to reactivate the communication session with the remote unit; delivering a packet via the physical layer communication path, the packet containing information indicative of the type of the communication request; and reactivating the communication session with the remote unit and using the communication session to support a connection stream between the application program and the remote unit.

In another embodiment, the data structure links a plurality of application sessions to the communication session, the application sessions including a first an application program which provides a communication service.

In another embodiment, the communication service comprises a voice telephony connection.

In another embodiment, the plurality of application sessions includes a second an application program which provides access to a database.

In another embodiment, the database comprises a medical record.

In another embodiment, a system for maintaining a virtual session is provided, the system comprising a virtual session server, the virtual session server being operatively coupled to an application program, the virtual session server maintaining an application session with the application program on behalf of a remote unit, the virtual session server maintaining a virtual communication session with the remote unit; and a table structure comprising a plurality of memory locations arranged within a storage unit, the table structure operative to maintain set of links correlating the virtual communication session and the application session.

In another embodiment, the system further comprises the remote unit, whereby the remote unit comprises a protocol stack used to maintain a communication session in the presence and absence of a physical layer communication path.

In another embodiment, the system further comprises the application program.

In another embodiment, the virtual session server is operative to execute a client-side application software module under remote control of the remote unit.

In another embodiment, the virtual session server is operative to execute a client-side application software module on the virtual session server in parallel with the remote unit; and maintain a presence with the application program while the physical layer communication path is in the disconnected state.

In another embodiment, the control program module is further operative to cause the virtual session server to maintain a communication path and grant the remote unit access to the application program via the communication path after the physical layer has been placed into the connected state.

In another embodiment, the virtual session server maintains a proxy-presence with the application program to prevent the application program from terminating in the absence of a physical layer communication path to the remote unit.

In another embodiment, the virtual session server accesses the table structure to provide access to the application program by the remote unit via the application session upon the reactivation of the virtual communication session.

What is claimed is:

1. A method, comprising:
   receiving, at a control program executing on a mobile handset, a first communication initiated by a remote entity, wherein the first communication includes a set of information identifying an application layer program that is installed on the mobile handset, and wherein initiation of the first communication by the remote entity was not in response to a request sent by the mobile handset;
   the control program causing the mobile handset to evaluate the set of information included in the first communication; and
   in response to determining, based on the evaluating, that the set of information identifies the application layer program, the control program causing the mobile handset to:
   launch the application layer program; and
   reactivate, from an inactive state, a communication session between the mobile handset and the remote entity.

2. The method of claim 1,
   wherein causing the mobile handset to reactivate the communication session includes the mobile handset establishing a physical layer connection with the remote entity.

3. The method of claim 2, wherein the communication session supports communication between the application layer program at the mobile handset and a remote program executing on a server coupled to the remote entity.

4. The method of claim 1, wherein the remote entity is a server.

5. The method of claim 1, wherein the first communication was initiated by the remote entity in response to information received by the remote entity from a server coupled to the remote entity via the Internet.

6. The method of claim 1, wherein launching the application layer program includes reactivating an inactive communication session.

7. The method of claim 1, wherein the first communication includes at least one data packet, and wherein the first communication is included in an incoming communication request that is received by a wireless interface of the mobile handset from a cellular or PCS network.

8. The method of claim 1, wherein the remote entity is a computer system that is remote from the mobile handset executing an application program.

9. The method of claim 1, wherein the application layer program is a messaging program.

10. The method of claim 9, wherein the application layer program is an email program.

11. The method of claim 10, wherein the information directed to the application layer program includes at least a portion of an email message.

12. The method of claim 1, wherein the application layer program is a telephony program.

13. The method of claim 12, wherein the information directed to the application layer program includes voice data corresponding to a telephone call.

14. The method of claim 1, wherein the first communication includes a caller identification packet.

15. A device, comprising:
    a wireless interface; and
    a processor unit;
    wherein the device is configured to:
    receive an unsolicited communication from a remote computer system, wherein the unsolicited communication is received using the wireless interface; and
    in response to determining that the unsolicited communication identifies an application that is in an inactive state:
    launch the application; and
    reactivate a communication session between the device and the remote computer system from an inactive state.

16. The device of claim 15, wherein reactivating the communication session includes the device establishing a physical layer connection with the remote computer system.

17. The device of claim 15, wherein the application is an email program that is in an inactive state on the device, and wherein the device is further configured to cause the email program to enter an active state on the device in response to the determining that the unsolicited communication identifies the email program.

18. The device of claim 15, wherein the application is a messaging program that is in an inactive state on the device and is connected through a virtual session to a messaging program executing on the remote computer system.

19. An article of manufacture, including a non-transitory computer-readable medium having instructions stored thereon that, in response to execution by a first computing device, cause the first computing device to perform operations comprising:
    receiving an unsolicited communication from a second computing device that is remote from the first computing device, wherein the unsolicited communication identifies an application that is in an inactive state at the first computing device;
    evaluating the unsolicited communication to determine the application; and
    based on the evaluating:

launching the application, wherein the launching the application causes the application to enter an active state; and reactivating, from an inactive state, a communication session supporting communication between the first computing device and the second computing device.

20. The article of manufacture of claim 19, wherein the application is connected through a virtual session to a program executing on the second computing device.

* * * * *

UNITED STATES PATENT AND TRADEMARK OFFICE
CERTIFICATE OF CORRECTION

PATENT NO. : 8,266,296 B2  
APPLICATION NO. : 12/272481  
DATED : September 11, 2012  
INVENTOR(S) : Dowling et al.

Page 1 of 1

It is certified that error appears in the above-identified patent and that said Letters Patent is hereby corrected as shown below:

On Title Page 2, in Field (56), under "OTHER PUBLICATIONS", in Column 2, Line 18, delete "pages." and insert -- pages --, therefor.

In Column 5, Line 23, delete "Pentium™." and insert -- Pentium™ --, therefor.

In Column 11, Line 60, delete "UltaSparc™." and insert -- UltaSparc™ --, therefor.

In Column 11, Line 63, delete "Solaris™." and insert -- Solaris™ --, therefor.

In Column 11, Line 63, delete "WindowsNT™." and insert -- WindowsNT™ --, therefor.

In Column 11, Line 67, delete "UltaSparc™." and insert -- UltaSparc™ --, therefor.

In Column 12, Line 2, delete "service provider" and insert -- Service Provider --, therefor.

In Column 14, Lines 5-6, delete "PCAnywhere™. from Semantec" and insert -- PCAnywhere™ from Symantec --, therefor.

In Column 22, Line 67, delete "in tact" and insert -- intact --, therefor.

Signed and Sealed this  
Fifth Day of February, 2013

Teresa Stanek Rea  
*Acting Director of the United States Patent and Trademark Office*